(12) United States Patent
Kawanishi

(10) Patent No.: US 11,499,655 B2
(45) Date of Patent: Nov. 15, 2022

(54) PIPE RETAINING DEVICE FOR PIPE FITTING

(71) Applicant: SK-KAWANISHI CO., LTD., Kagawa (JP)

(72) Inventor: Hidehito Kawanishi, Kagawa (JP)

(73) Assignee: SK-KAWANISHI CO., LTD., Kagawa (JP)

(*) Notice: Subject to any disclaimer, the term of this patent is extended or adjusted under 35 U.S.C. 154(b) by 0 days.

(21) Appl. No.: 17/619,166

(22) PCT Filed: Nov. 6, 2020

(86) PCT No.: PCT/JP2020/041610
§ 371 (c)(1),
(2) Date: Dec. 14, 2021

(87) PCT Pub. No.: WO2021/090939
PCT Pub. Date: May 14, 2021

(65) Prior Publication Data
US 2022/0213990 A1 Jul. 7, 2022

(30) Foreign Application Priority Data
Nov. 7, 2019 (JP) .............................. JP2019-202724

(51) Int. Cl.
*F16L 21/06* (2006.01)
(52) U.S. Cl.
CPC .................. *F16L 21/065* (2013.01)
(58) Field of Classification Search
CPC . F16L 19/065; F16L 19/0653; F16L 19/0656; F16L 21/08; F16L 21/04;
(Continued)

(56) References Cited

U.S. PATENT DOCUMENTS

2016/0290538 A1* 10/2016 Kawanishi ............ F16L 23/036
2017/0211734 A1* 7/2017 Kawanishi .............. F16L 21/08

FOREIGN PATENT DOCUMENTS

| JP | 2015-190608 A | 11/2015 |
| JP | 2018-109417 A | 7/2018 |
| WO | WO-2015/087802 A1 | 6/2015 |

OTHER PUBLICATIONS

International Search Report issued in Application No. PCT/JP2020/041610, dated Dec. 28, 2020.

* cited by examiner

*Primary Examiner* — Aaron M Dunwoody
(74) *Attorney, Agent, or Firm* — Michael Best & Friedrich LLP

(57) ABSTRACT

Provided is a pipe retaining device, for a pipe fitting, which has a simple structure but is capable of further improving a detachment preventing force for a pipe without inserting an inner core. The pipe retaining device includes an inclination mechanism (7) configured to incline a retaining ring (3A) in a pipe axis direction with respect to a reference plane (P) orthogonal to a central axis of a ring body (30A), such that each circumferential end portion (30x) of the ring body (30A) is caused to be closer to a fitting body (2) and a circumferential center portion (30y) of the ring body (30A) is moved away from the fitting body (2), when each retaining ring connecting portion (32) and each facing portion (54) come into contact with each other. A first surface (56), facing the retaining ring connecting portion (32), of each facing portion (54) is parallel to a reference plane P. Respective second surfaces (34a, 34b), facing the facing portion (54), of a plurality of the retaining ring connecting portions (32) are located within the same inclined plane (PI) inclined in the pipe axis direction with respect to the reference plane (P). An interval (B) between the first surface (56) and the (Continued)

inclined plane (PI) becomes larger from the circumferential end portions (30*x*) toward the circumferential center portion (30*y*).

9 Claims, 18 Drawing Sheets

(58) Field of Classification Search
CPC ......... F16L 21/065; F16L 27/00; F16L 27/12; F16L 23/036
USPC .......................... 285/114, 223, 249, 902, 81
See application file for complete search history.

PIPE RETAINING DEVICE FOR PIPE FITTING

TECHNICAL FIELD

The present invention relates to a pipe retaining device for a pipe fitting. More specifically, the present invention relates to a pipe retaining device, for a pipe fitting, which includes: a retaining ring tightened and fixed to the outer peripheral surface of a joint pipe by reducing the diameter of a ring body having a C-shaped ring shape by tightening means; a pressing ring configured to press a packing against a receiving portion of a fitting body; and connecting means configured to connect the retaining ring and the pressing ring to the fitting body.

BACKGROUND ART

Conventionally, as a pipe retaining device for a pipe fitting as described above, for example, one described in PATENT DOCUMENT 1 is known. In the conventional pipe retaining device, as shown in FIG. 28, when a pulling force is generated in a pipe axis direction X at a joint pipe 100, a flat surface of each retaining ring connecting portion 32' of a retaining ring 3' and a flat surface of each flange portion 54' of connecting means 5' come into contact with each other to oppose the pulling force. In the conventional pipe retaining device, an inner core may be inserted into the joint pipe in order to improve a detachment preventing force for the pipe. However, further improving the detachment preventing force for the pipe without inserting the inner core in order to improve workability has been desired.

CITATION LIST

Patent Documents

[PATENT DOCUMENT 1] Japanese Laid-Open Patent Publication No. 2015-190608

SUMMARY OF THE INVENTION

Problems to be Solved by the Invention

In view of the circumstances described above, an object of the present invention is to provide a pipe retaining device, for a pipe fitting, which has a simple structure but is capable of further improving a detachment preventing force for a pipe without inserting an inner core.

Solution to the Problems

In order to achieve the above object, a feature of a pipe retaining device for a pipe fitting according to the present invention is that in a configuration of including: a retaining ring tightened and fixed to an outer peripheral surface of a joint pipe by reducing a diameter of a ring body having a C-shaped ring shape by tightening means; a pressing ring configured to press a packing against a receiving portion of a fitting body; and connecting means configured to connect the retaining ring and the pressing ring to the fitting body, the retaining ring includes a pair of projecting pieces which are provided at both circumferential end portions of the ring body and each of which has a through hole through which the tightening means is caused to extend, a tooth portion which is provided on an inner side of the ring body and which bites into the joint pipe due to diameter reduction by the tightening means, and a plurality of retaining ring connecting portions which are arranged at appropriate intervals along a circumferential direction of the ring body and each of which has a retaining ring penetration portion through which the connecting means is caused to extend, the pressing ring includes a plurality of pressing ring connecting portions which face the plurality of retaining ring connecting portions in a pipe axis direction and each of which has a pressing ring through hole through which the connecting means is caused to extend, the connecting means includes first penetrating members each of which extends through a through hole of the fitting body and the pressing ring through hole, and second penetrating members each of which includes a connection portion extending through the retaining ring penetration portion and connected to the first penetrating member and a facing portion facing the retaining ring connecting portion in the pipe axis direction, the pipe retaining device includes an inclination mechanism configured to incline the retaining ring in the pipe axis direction with respect to a reference plane orthogonal to a central axis of the ring body, such that each circumferential end portion of the ring body is caused to be closer to the fitting body and a circumferential center portion of the ring body is moved away from the fitting body, when each retaining ring connecting portion and each facing portion come into contact with each other in a state where the diameter of the ring body is reduced by the tightening means, a first surface, facing the retaining ring connecting portion, of each facing portion is parallel to the reference plane, second surfaces, facing the facing portions, of the plurality of retaining ring connecting portions are located within the same inclined plane inclined in the pipe axis direction with respect to the reference plane, and an interval between the first surface and the inclined plane becomes larger from the circumferential end portions toward the circumferential center portion.

According to the above configuration, the connecting means includes first penetrating members each of which extends through a through hole of the fitting body and the pressing ring through hole, and second penetrating members each of which includes a connection portion extending through the retaining ring penetration portion and connected to the first penetrating member and a facing portion facing the retaining ring connecting portion in the pipe axis direction. In addition, a first surface, facing the retaining ring connecting portion, of each facing portion is parallel to a reference plane orthogonal to a central axis of the ring body, second surfaces, facing the facing portions, of the plurality of retaining ring connecting portions are located within the same inclined plane inclined in the pipe axis direction with respect to the reference plane, and an interval between the first surface and the inclined plane becomes larger from the circumferential end portions toward the circumferential center portion. Here, in a state where the diameter of the ring body is reduced by the tightening means, the tooth portion of the retaining ring bites into the joint pipe more on the circumferential end portion side where the tightening means is located, than the circumferential center portion side of the ring body, so that a greater pipe detachment preventing force is generated on the circumferential end portion side than at the circumferential center portion. Therefore, when a pipe pulling force is applied to the joint pipe, the joint pipe is stretched more on the circumferential end portion side than at the circumferential center portion, and each retaining ring connecting portion and each facing portion come into contact with each other. Then, when the pipe pulling force is further applied, due to the interval (gap). between the first surface and the inclined surface, the inclination mechanism inclines the retaining ring in the pipe axis direction with respect to the reference plane such that each circumferential end portion of the ring body is caused to be closer to the fitting body and the circumferential center portion of the ring body is moved away from the fitting body. Accordingly, the ring body bites on each of the circumferential end portion side and the circumferential center portion side of the joint pipe to deform (bend) the joint pipe. The deformation of the joint pipe becomes a large resistance to the pipe pulling force. Furthermore, due to the inclination of the retaining ring, the amount by which the tooth portion in the vicinity of the circumferential center portion bites also increases. Therefore, the deformation of the ring body and the biting of the tooth portion into the pipe become a large resistance to the pipe pulling force, so that it is possible to significantly improve the detachment preventing force for the pipe.

Moreover, as a second configuration, the plurality of retaining ring connecting portions may include a pair of first retaining ring connecting portions adjacent to the pair of projecting pieces, and a pair of second retaining ring connecting portions adjacent to the pair of first retaining ring connecting portions, the pair of first retaining ring connecting portions and the pair of second retaining ring connecting portions may be arranged so as to be line-symmetrical with respect to a center line connecting the central axis and the circumferential center portion, first retaining ring penetration portions of the first retaining ring connecting portions may each be an elongated hole in which the connection portion is slidable along the circumferential direction of the ring body and which has a smaller width than the facing portion, and second retaining ring penetration portions of the second retaining ring connecting portions may each be an elongated hole in which the connection portion is slidable in a direction along the center line and which has a smaller width than the facing portion.

The first retaining ring penetration portions of the first retaining ring connecting portions are each an elongated hole in which the connection portion is slidable along the circumferential direction of the ring body and which has a smaller width than the facing portion, and the second retaining ring penetration portions of the second retaining ring connecting portions are each an elongated hole in which the connection portion is slidable in a direction along the center line and which has a smaller width than the facing portion. Accordingly, each connection portion which extends through the retaining ring penetration portion during diameter reduction of the retaining ring does not hinder the diameter reduction, so that smooth diameter reduction along the elongated holes is enabled. In addition, each connection portion does not fall off from the retaining ring penetration portion during diameter reduction and after diameter reduction, and thus a detachment preventing force for the pipe can be ensured.

Meanwhile, as a third configuration, the plurality of retaining ring connecting portions may include a pair of first retaining ring connecting portions adjacent to the pair of projecting pieces, and a second retaining ring connecting portion located at the circumferential center portion, the pair of first retaining ring connecting portions may be arranged so as to be line-symmetrical with respect to a center line connecting the central axis and the circumferential center portion, first retaining ring penetration portions of the first retaining ring connecting portions may each be an elongated hole in which the connection portion is slidable along the circumferential direction of the ring body and which has a smaller width than the facing portion, and a second retaining ring penetration portion of the second retaining ring connecting portion may each be a recess which is open on one side thereof or a hole which has a smaller width than the facing portion and in which the connection portion is slidable in a direction along the center line.

The first retaining ring penetration portions of the first retaining ring connecting portions are each an elongated hole in which the connection portion is slidable along the circumferential direction of the ring body and which has a smaller width than the facing portion, and the second retaining ring penetration portion of the second retaining ring connecting portion is a recess which is open on one side thereof or a hole which has a smaller width than the facing portion and in which the connection portion is slidable in a direction along the center line. Accordingly, each connection portion which extends through the retaining ring penetration portion during diameter reduction of the retaining ring does not hinder the diameter reduction, so that smooth diameter reduction along the elongated holes is enabled. In addition, each connection portion does not fall off from the retaining ring penetration portion during diameter reduction and after diameter reduction, and thus a detachment preventing force for the pipe can be ensured.

Moreover, as a fourth configuration, the plurality of retaining ring connecting portions may include a pair of retaining ring connecting portions each located at an intermediate portion between the circumferential center portion and the circumferential end portion of the ring body, the pair of retaining ring connecting portions may be arranged so as to be line-symmetrical with respect to a center line connecting the central axis and the circumferential center portion, and retaining ring penetration portions of the retaining ring connecting portions may each be a recess which is open on one side thereof or an elongated hole which has a smaller width than the facing portion and in which the connection portion is slidable.

The retaining ring penetration portions of the retaining ring connecting portions are each a recess which is open on one side thereof or an elongated hole which has a smaller width than the facing portion and in which the connection portion is slidable. Accordingly, each connection portion which extends through the retaining ring penetration portion during diameter reduction of the retaining ring does not hinder the diameter reduction, so that smooth diameter reduction along the elongated holes is enabled. In addition, each connection portion does not fall off from the retaining ring penetration portion during diameter reduction and after diameter reduction, and thus a detachment preventing force for the pipe can be ensured.

Moreover, as a fifth configuration, the plurality of retaining ring connecting portions may include a pair of first retaining ring connecting portions adjacent to the pair of projecting pieces, a pair of second retaining ring connecting portions adjacent to the circumferential center portion, and a pair of third retaining ring connecting portions each located at an intermediate portion between the first retaining ring connecting portion and the second retaining ring connecting portion, the pair of first retaining ring connecting portions, the pair of second retaining ring connecting portions, and the pair of third retaining ring connecting portions may be arranged so as to be line-symmetrical with respect to a center line connecting the central axis and the circumferential center portion, and a retaining ring penetration portion of each of the retaining ring connecting portions may be an elongated hole in which the connection portion is slidable along the circumferential direction of the ring body and which has a smaller width than the facing portion.

The retaining ring penetration portion of each of the retaining ring connecting portions is an elongated hole in which the connection portion is slidable along the circumferential direction of the ring body and which has a smaller width than the facing portion. Accordingly, each connection portion which extends through the retaining ring penetration portion during diameter reduction of the retaining ring does not hinder the diameter reduction, so that smooth diameter reduction along the elongated holes is enabled. In addition, each connection portion does not fall off from the retaining ring penetration portion during diameter reduction and after diameter reduction, and thus a detachment preventing force for the pipe can be ensured.

Furthermore, as a sixth configuration, in addition to the above second configuration, the plurality of retaining ring connecting portions further may include a pair of third retaining ring connecting portions each located at an intermediate portion between the first retaining ring connecting portion and the second retaining ring connecting portion, the pair of third retaining ring connecting portions may be arranged so as to be line-symmetrical with respect to the center line connecting the central axis and the circumferential center portion, and third retaining ring penetration portions of the third retaining ring connecting portions may each be an elongated hole in which the connection portion is slidable along the circumferential direction of the ring body and which has a smaller width than the facing portion.

The first and third retaining ring penetration portions of the first and third retaining ring connecting portions are each an elongated hole in which the connection portion is slidable along the circumferential direction of the ring body and which has a smaller width than the facing portion, and the second retaining ring penetration portions of the second retaining ring connecting portions are each an elongated hole in which the connection portion is slidable in a direction along the center line and which has a smaller width than the facing portion. Accordingly, each connection portion which extends through the retaining ring penetration portion during diameter reduction of the retaining ring does not hinder the diameter reduction, so that smooth diameter reduction along the elongated holes is enabled. In addition, each connection portion does not fall off from the retaining ring penetration portion during diameter reduction and after diameter reduction, and thus a detachment preventing force for the pipe can be ensured.

In any one of the above configurations, the joint pipe may be a high-performance polyethylene pipe (HPPE/PE100) having a nominal diameter of 100 or greater. In addition, in another configuration, the joint pipe may be a high-performance polyethylene pipe (HPPE/PE100) having a nominal diameter of 75 or less.

In any one of the above configurations, the first penetrating members may be T-shaped bolts, and the second penetrating members may be flanged cap nuts. In this case, the connecting means may further include contact members through each of which the first penetrating member extends and each of which comes into contact with the connection portion and the pressing ring connecting portion. Due to the contact members, the contact area of the connection portion of each flanged cap nut with the pressing ring connecting portion becomes wider (larger), and the contact members do not rotate together with the flanged cap nuts. Therefore, even if the flanged cap nut comes into contact with the retaining ring connecting portion when the retaining ring is tightened, the T-shaped bolt and the flanged cap nut screwed by the contact member smoothly slide, and do not hinder the diameter reduction of the retaining ring. Accordingly, it is easy to adjust the gap (interval) between the retaining ring connecting portion and the flange portion without producing the flanged cap nut according to the thickness (width in the pipe axis direction X) of the retaining ring connecting portion.

In any one of the above configurations, the inclined plane may be a plane inclined at an angle greater than 0° and equal to or less than 5° in the pipe axis direction with respect to the reference plane. At this angle, an amount of stretching and contraction can be ensured within the fitting while ensuring a detachment preventing force for the pipe, so that the joint pipe does not come off from the packing, which leads to water leakage, and the workability is good.

Advantageous Effects of the Invention

According to the features of the pipe retaining device for a pipe fitting according to the present invention, it becomes possible to further improve a detachment preventing force for a pipe, without inserting an inner core, even with a simple structure.

Other objects, configurations, and effects of the present invention will become apparent from the following description of embodiments of the present invention.

DESCRIPTION OF EMBODIMENTS

Next, a first embodiment of the present invention will be described in detail with reference to FIGS. 1 to 7.

(Overview of Device 1)

Figure 1:
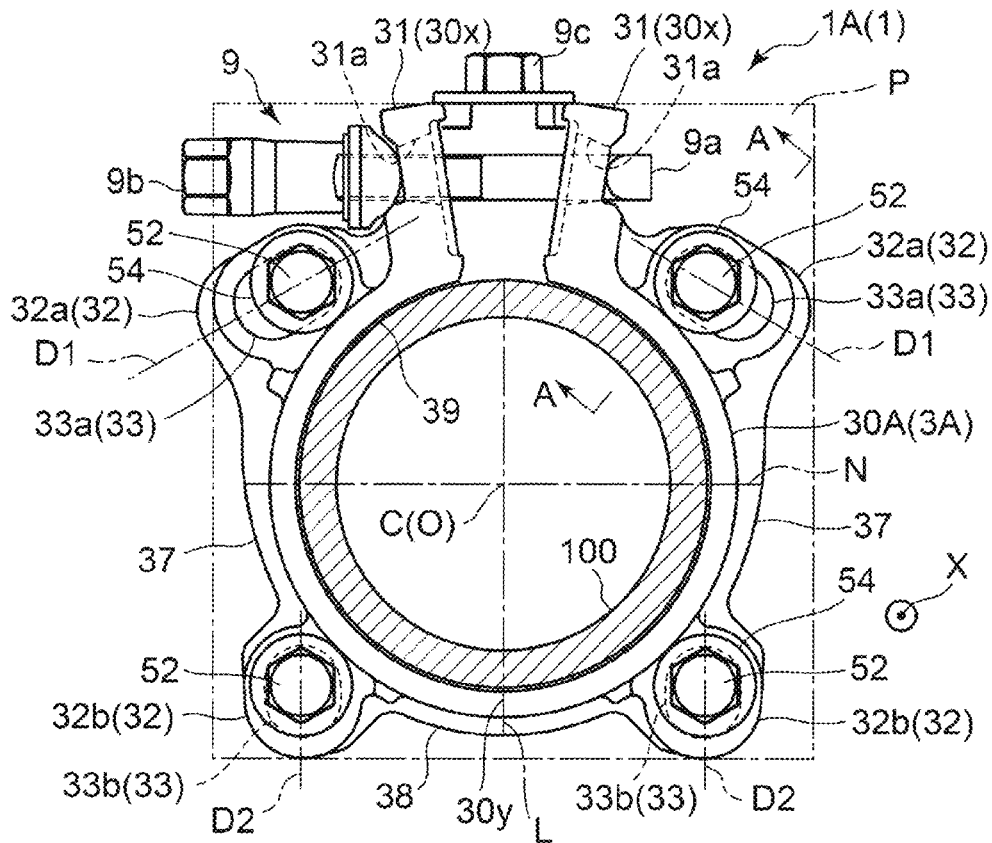
FIG. 1 is a front view of a pipe retaining device according to a first embodiment of the present invention.
Figure 2:
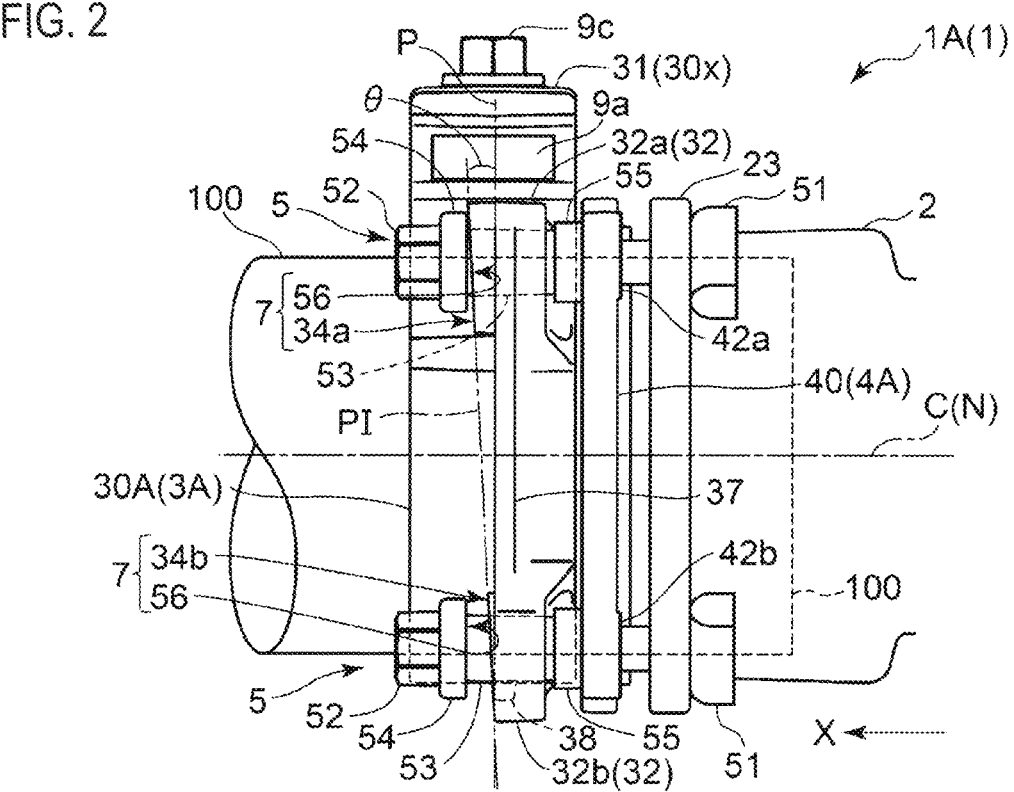
FIG. 2 is a side view of FIG. 1.
Figure 3:
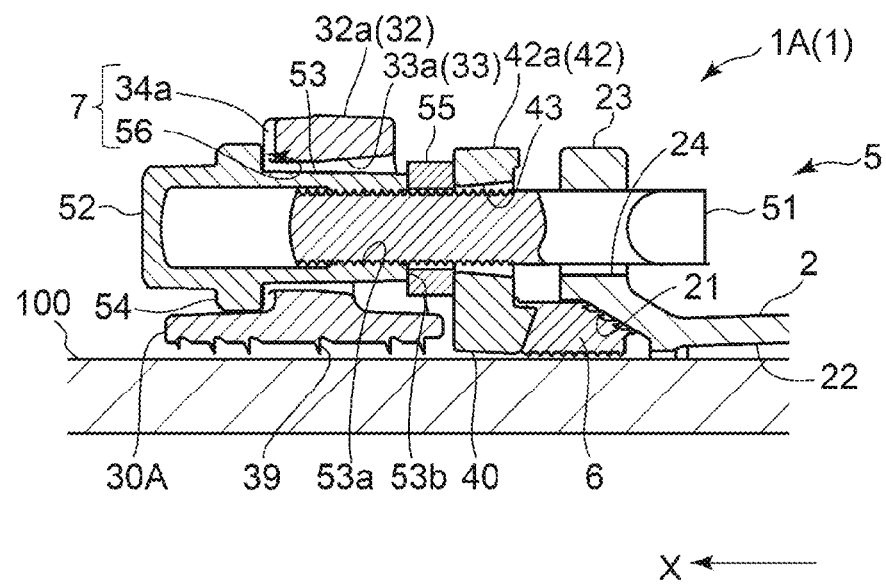
FIG. 3 is a cross-sectional view taken along a line A-A in FIG. 1.
Figure 4A:
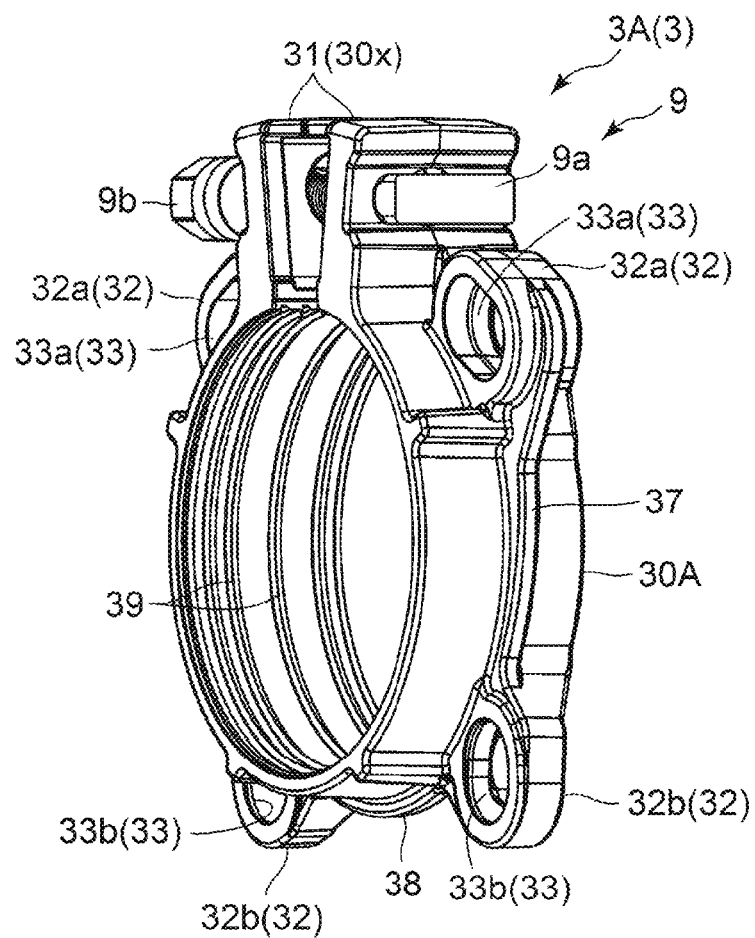
FIG. 4A is a perspective view of a retaining ring of the first embodiment.
Figure 4B:
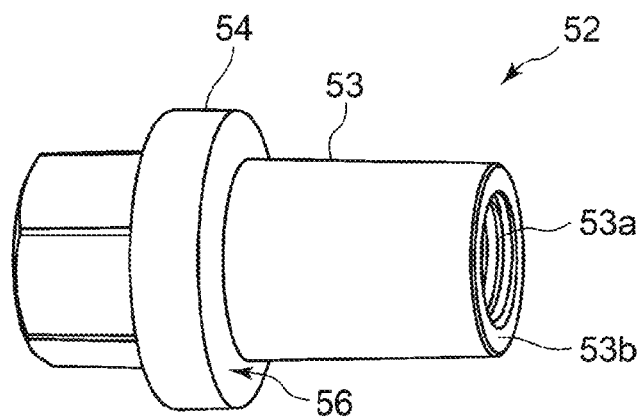
FIG. 4B is a perspective view of a flanged cap nut of the first embodiment.

As shown in FIGS. 1 to 3, a pipe retaining device 1A according to the first embodiment of the present invention roughly includes: a retaining ring 3 which is tightened and fixed to the outer peripheral surface of a joint pipe 100 by reducing the diameter of a ring body 30A having a C-shaped ring shape by tightening means 9; a pressing ring 4A which presses a packing 6 against a receiving portion 21 of a fitting body 2; connecting means 5 which connects and fixes the retaining ring 3A and the pressing ring 4A to the fitting body 2; and an inclination mechanism 7 which will be described later.

(Joint Pipe 100)

In the present embodiment, the joint pipe 100 is, for example, a high-performance polyethylene pipe (also referred to as Higher Performance Polyethylene, commonly known as "HPPE", or "third generation high-density polyethylene pipe"), and the nominal diameter thereof is 150. In the case of polyethylene pipes including the high-performance polyethylene pipe (PE100), unless diameter reduction is performed to a diameter slightly smaller than the pipe outer diameter via the retaining ring 3A, it is difficult to prevent detachment of the pipe. For such a plastic pipe having elasticity and flexibility, without using an inner core, the pipe retaining device 1 according to the present invention improves the holding force (detachment preventing force) for the pipe and also improves workability without hindering the diameter reduction.

PE100 refers to a pipe for which the 97.5% confidence lower limit of a long-term hydrostatic strength obtained by the method specified in ISO 9080: "Plastics piping and ducting systems—Determination of the long-term hydrostatic strength of thermoplastics materials in pipe form by extrapolation" is 10.00 to 11.29 MPa, and is classified as one having minimum required strength (MRS)=10.0 MPa. In addition, the long-term hydrostatic strength (minimum required strength) is a circumferential stress value that allows the pipe to withstand use at 20° for 50 years, and is calculated (predicted) on the basis of data of an internal pressure creep test.

In the case of a high-performance polyethylene pipe (SDR11 PE100), a detachment preventing force for the pipe which further exceeds the specified test load specified for each nominal diameter with respect to pipe strength is ensured. Here, according to the UK water industry standard, regarding a pipe detachment preventing force equal to or greater than the pipe strength for a high-performance polyethylene pipe, a pipe having a pipe detachment preventing force of 40 kN or more in the case of a nominal diameter of 75, a pipe having a pipe detachment preventing force of 77 kN or more in the case of a nominal diameter of 100, and a pipe having a pipe detachment preventing force of 160 kN or more in the case of a nominal diameter of 150 correspond to type 1, and are classified as pipes for which the joint strength is equal to or higher than the pipe strength. In the present embodiment, a detachment preventing force for the pipe which further exceeds this is ensured. It should be noted that the high-performance polyethylene pipe is usually not used as an exposed pipe but is used as a buried pipe. Therefore, the pipe is not bent and deformed by the normal use pressure (0.75 MPa) or the water pressure of a water pressure leak test (0.5 MPa or less) after construction.

(Fitting Body 2)

As shown in FIGS. 1 to 3, the fitting body 2 has the receiving portion 21 having a tapered shape, and a cavity 22 for positioning an end portion of the joint pipe 100 therein, and a flange 23 having a substantially rectangular shape is provided on the outer periphery of the fitting body 2. A through hole 24 through which a first penetrating member 51, which will be described later, is inserted is formed at each of the four corners of the flange 23.

(Retaining Ring 3A)

As shown in FIGS. 1 to 3 and 4A, the retaining ring 3A roughly includes the ring body 30A, a pair of projecting pieces 31, 31 provided at both circumferential end portions 30x, 30x of the ring body 30A, and a plurality of retaining ring connecting portions 32 arranged at appropriate intervals along the circumferential direction of the ring body 30A. Each projecting piece 31 has a through hole 31a through which a bolt 9a of the tightening means 9 is caused to extend.

In the present embodiment, the retaining ring connecting portions 32 include first retaining ring connecting portions 32a adjacent to the projecting piece 31, and second retaining ring connecting portions 32b which are farther from the projecting piece 31 than the first retaining ring connecting portions 32a are, and are provided in a pair so as to be line-symmetrical with respect to a center line L connecting a central axis C of the retaining ring 3A and a circumferential center portion 30y.

The first and second retaining ring connecting portions 32a and 32b are provided with elongated holes 33a and 33b as retaining ring penetration portions 33 through which second penetrating members 52, which will be described later, are caused to extend. As shown in FIG. 1, a longitudinal direction D1 of the elongated hole 33a of each first retaining ring connecting portion 32a (a center line d1 of the elongated hole 33a) is oriented toward the projecting piece 31 and intersects the center line L. On the other hand, a longitudinal direction D2 of the elongated hole 33b of each second retaining ring connecting portion 32b (a center line d2 of the elongated hole 33b) is parallel to the center line L.

It should be noted that the ring body 30A is line-symmetrical with respect to the center line L, and first and second ribs 37 and 38 are provided on the outer surface of the ring body 30A so as to project outward. Each first rib 37 is provided between the first retaining ring connecting portion 32a and the second retaining ring connecting portion 32b, and is formed so as to be gradually thinner (lower) from the first retaining ring connecting portion 32a toward the second retaining ring connecting portion 32b. The second rib 38 is provided between a pair of the second retaining ring connecting portions 32b, 32b, and is formed with a uniform wall thickness (height). Due to the first and second ribs 37 and 38, the diameter of the ring body 30A is reduced by the tightening means 9 substantially uniformly in the circumferential direction. In addition, a plurality of tooth portions 39 which bite into the joint pipe 100 due to the diameter reduction of the ring body 30A by the tightening means 9 are formed on the inner peripheral surface of the ring body 30A along the circumferential direction.

(Pressing Ring 4A)

As shown in FIGS. 1 to 3, the pressing ring 4A includes a main body 40 having an annular shape, and first and second pressing ring connecting portions 42a and 42b which protrude outward from the main body 40 and which face the first and second retaining ring connecting portions 32a and 32b in a pipe axis direction X. A circular pressing ring through hole 43 through which the first penetrating member 51 is caused to extend is provided at each of the centers of the first and second pressing ring connecting portions 42a and 42b. The first and second pressing ring connecting portions 42a and 42b have the same shape, and are provided at equal intervals of approximately 90° so as to be rotationally symmetrical with respect to the center of the pressing ring 4A. Accordingly, for example, when disassembling and reassembling the pipe retaining device 1, it is possible to perform connection and fixation by the connecting means 5 regardless of which pressing ring connecting portion 42 is located with respect to each retaining ring connecting portion 32. Therefore, the workability is good. In addition, the longitudinal direction D1 of the elongated hole 33a corresponds to a straight line connecting the positions of the through hole 43 of the first pressing ring connecting portion 42a with respect to the ring body 30A before and after tightening the retaining ring 3A. Moreover, the longitudinal direction D2 of the elongated hole 33b corresponds to a straight line connecting the positions of the through hole 43 of the second pressing ring connecting portion 42b with respect to the ring body 30A before and after tightening the retaining ring 3A.

(Connecting Means 5)

As shown in FIGS. 1 to 3 and 4B, each connecting means 5 roughly includes the first penetrating member 51 which extends through the through hole 24 of the fitting body 2 and the pressing ring through hole 43, and the second penetrating member 52 which includes: a connection portion 53 extending through the retaining ring penetration portion 33 (elongated hole 33a or 33b) and connected to the first penetrating member 51; and a facing portion 54 facing the retaining ring connecting portion 32 (first or second retaining ring connecting portion 32a or 32b) in the pipe axis direction X.

In the present embodiment, the first penetrating member 51 is a T-shaped bolt, and the second penetrating member 52 is a flanged cap nut. In the flanged cap nut 52, the connection portion 53 is a cylindrical portion inside of which a thread groove 53a is formed, and the facing portion 54 is a ring-shaped flange portion protruding outward from the cylindrical portion 53. In addition, each connecting means 5 further includes a washer 55 as a contact member through which the T-shaped bolt 51 extends and which comes into contact with the cylindrical portion 53 and the pressing ring connecting portion 42.

Figure 5A:
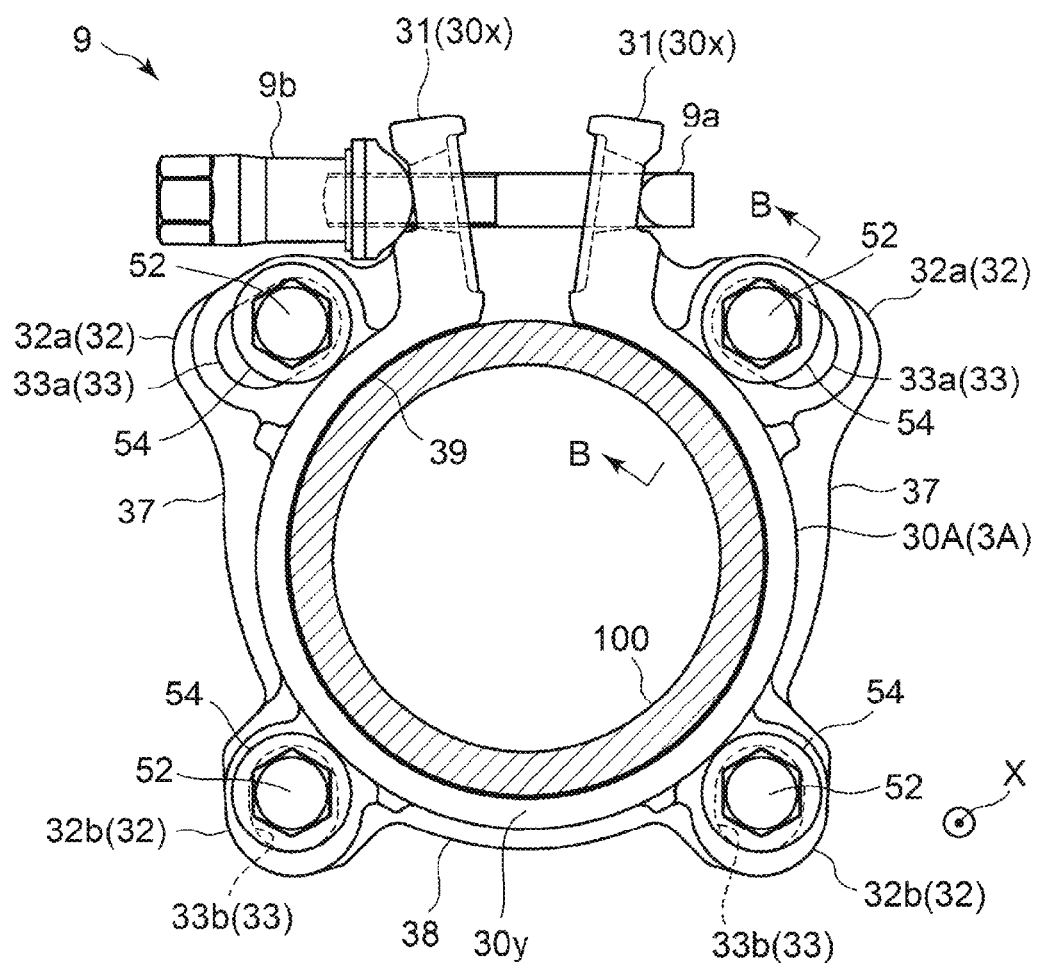
FIG. 5A is a diagram corresponding to FIG. 1 and showing a state after firm tightening of connecting means and before tightening of tightening means of the retaining ring.
Figure 5B:
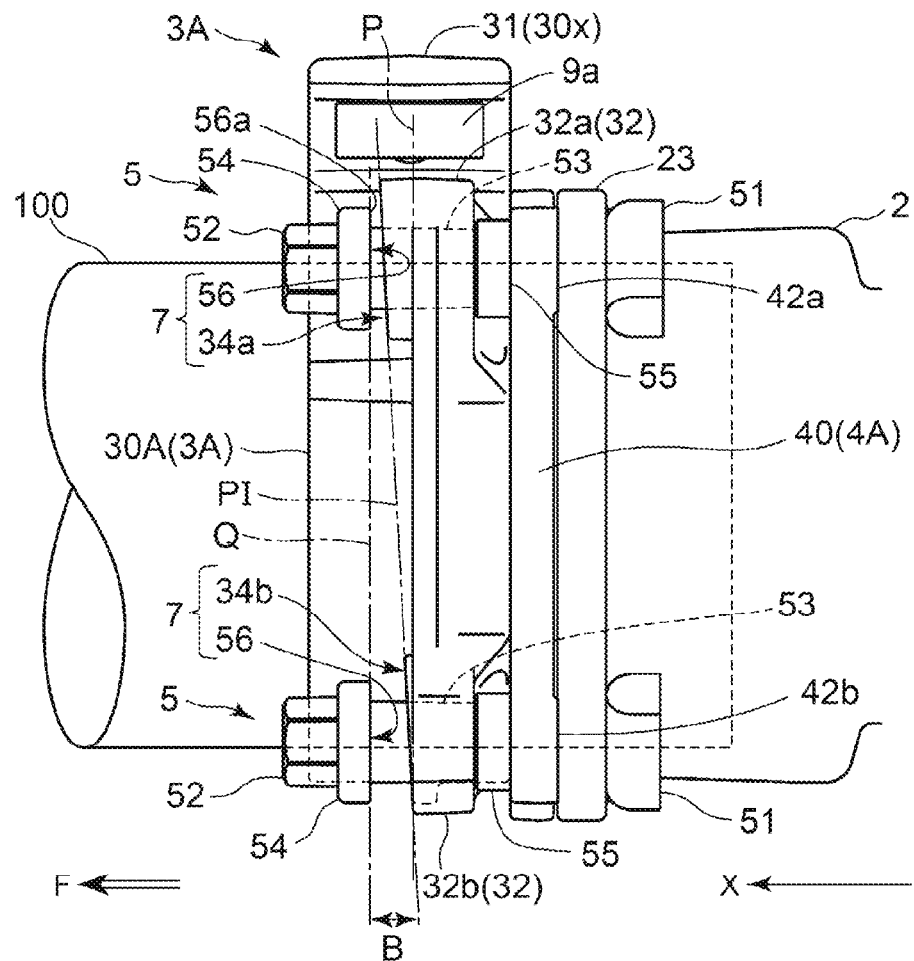
FIG. 5B is a side view of FIG. 5A.
Figure 5C:
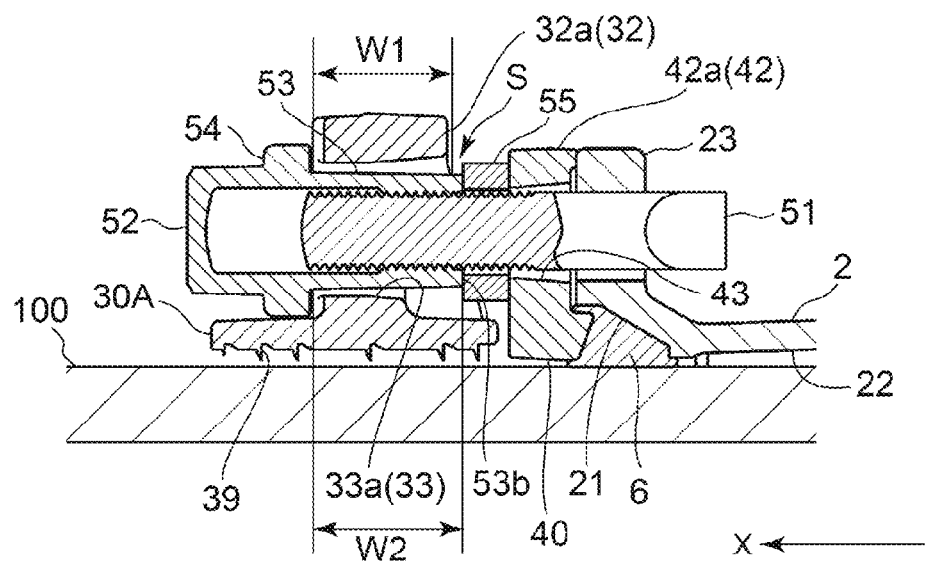
FIG. 5C is a cross-sectional view taken along a line B-B in FIG. 5A.

In the pipe retaining device, the pressing ring 4 is fixed to the fitting body 2 by the connecting means 5 before tightening the ring body 30A (reducing the diameter of the retaining ring 3 (FIG. 5C). At this time, the centers of the T-shaped bolt 51 and the pressing ring through hole 43 may be displaced relative to each other. By placing the washer 55 between the cylindrical portion 53 and the pressing ring connecting portion 42, the contact area of the flanged cap nut 52 with respect to the pressing ring connecting portion 42 is wider (larger) than that when an end portion 53b of the cylindrical portion 53 is brought into direct contact with the pressing ring connecting portion 42. In addition, since the flanged cap nut 52 is screwed to the T-shaped bolt 51, the surface of the pressing ring connecting portion 42 is not scratched by the rotation of the cylindrical portion 53. Moreover, the washer 55 is merely compressed without rotating together with the flanged cap nut 52. Therefore, even if the flanged cap nut 52 comes into contact with the retaining ring penetration portion 33 when the retaining ring 3A is tightened, the flanged cap nut 52 to which the T-shaped bolt 51 has been screwed slides smoothly due to the washer 55, and does not hinder the diameter reduction of the retaining ring 3A. In addition, it is possible to adjust the gap (interval) between the retaining ring connecting portion 32 and the flange portion 54 without producing the flanged cap nut 52 (cylindrical portion 53) according to the thickness (width in the pipe axis direction X) of the retaining ring connecting portion 32.

(Inclination Mechanism 7)

In the present embodiment, when each retaining ring connecting portion 32a, 32b comes into contact with the flange portion 54 in a state where the diameter of the ring body 30A is reduced by the tightening means 9, the inclination mechanism 7 inclines the retaining ring 3A in the pipe axis direction X with respect to a reference plane P orthogonal to the central axis C of the ring body 30A, such that each circumferential end portion 30x of the ring body 30A is caused to be closer to the fitting body 2 and the circumferential center portion 30y is moved away from the fitting body 2. In other words, in the present invention, the inclination mechanism 7 inclines the retaining ring 3A toward a horizontal plane N which includes the central axis C of the ring body 30A and which is orthogonal to the center line L connecting a center O of the ring body 30A and the circumferential center portion 30y. As described above, since the high-performance polyethylene pipe is used as a buried pipe, the pipe is not bent and deformed by the normal use pressure or in a water pressure leak test. That is, the inclination mechanism 7 functions when a large pulling force is generated at the pipe in a normal use state.

As shown in FIGS. 2 and 5B, each of first surfaces 56 (facing plane Q shown by an alternate long and short dash line in FIG. 5B), facing the respective retaining ring connecting portions 32a and 32b, of the flange portions 54 is parallel to the reference plane P. Meanwhile, second surfaces 34a and 34b, facing the flange portions 54, of the first and second retaining ring connecting portions 32a and 32b are located within the same inclined plane PI inclined in the pipe axis direction X at an inclination angle θ with respect to the reference plane P. The inclination mechanism 7 includes the second surfaces 34a and 34b of the retaining ring connecting portions 32 (first and second retaining ring connecting portions 32a and 32b) (inclined plane PI) and the first surfaces 56 of the flange portions (facing portions) 54. In addition, an interval B between the first surface 56 and the inclined plane PI becomes larger from the circumferential end portions 30x toward the circumferential center portion 30y. It should be noted that in FIG. 5B, each first surface 56 is located within the same facing plane Q. However, it is sufficient that in a state where the retaining ring 3A is tightened, a gap is formed between each first surface 56 and the inclined plane PI such that the interval B becomes larger from the circumferential end portions 30x toward the circumferential center portion 30y.

Meanwhile, it is also conceivable to incline the retaining ring 3 in the pipe axis direction X with respect to the reference plane P such that the circumferential center portion 30y of the ring body 30 is caused to be closer to the fitting body 2 and each circumferential end portion 30x is moved away from the fitting body 2. However, in the high-performance polyethylene pipe (SDR11 PE100), when the diameter of the ring body 30A is reduced, the tooth portions 39 of the retaining ring 3 bite into the joint pipe 100 more as the tooth portions 39 are closer to the circumferential end portion 30x side rather than the circumferential center portion 30y, so that greater pipe detachment prevention performance is exhibited on the circumferential end portion 30x side than that at the circumferential center portion 30y. When a pipe pulling force F acts on the pipe, the fitting body 2 side of the ring body 30 at the circumferential center portion 30y tries to bite into the joint pipe 100 due to the inclination of the retaining ring 3, and thus the amount by which the tooth portions 39 at the circumferential center portion 30y bite is decreased (the teeth are raised). Then, when the pipe pulling force F further acts, the joint pipe 100 is displaced relative to the retaining ring 3A on the circumferential center portion 30y side. Therefore, the effect of improving the detachment preventing force for the pipe due to the inclination of the retaining ring 3 is small as compared to the present embodiment. As described above, the inclination mechanism 7 of the present invention causes each circumferential end portion 30x of the ring body 30A to be closer to the fitting body 2 and also moves the circumferential center portion 30y away from the fitting body 2.

Here, it is sufficient that the inclined plane PI is inclined at an inclination angle θ that is greater than 0° and not greater than 5° with respect to the reference plane P. Preferably, the inclination angle θ is not less than 1° and not greater than 5°. As the inclination angle increases, the size of the space that allows the inclination also increases. Thus, it is necessary to decrease the amount of stretching and contraction of the joint pipe 100. In the case of the joint pipe 100 (nominal diameter: 150) according to the present embodiment, it is sufficient that the inclination angle is not less than 2° and not greater than 3°. If the inclination angle exceeds 5°, it becomes difficult to ensure the amount of stretching and contraction of the joint pipe 100 inside the fitting, so that the joint pipe 100 may come off from the packing 6, which leads to water leakage. In addition, in order to ensure this inclination angle, it is necessary to extend the cylindrical portion 53 of the flanged cap nut 52, which increases the production cost.

According to a tensile experiment by the inventor with a high-performance polyethylene pipe (PE100) having a nominal diameter of 150, the maximum load was 171.9 kN in the case of an inclination angle of 0°. The maximum load was 177.2 kN at an inclination angle of 2°, and the maximum load was 184.4 kN at an inclination angle of 3°. On the other hand, in the case of a conventional product in which a retaining ring is tightened after a pressing ring is temporarily fixed, the maximum load was 171.8 kN.

Here, as described above, a pipe that is classified as type 1 in the UK water industry standard is a pipe that has a pipe detachment preventing force of 160 kN or more with a nominal diameter of 150. Based on this standard, for the conventional product in the above experiment, 171.8−160=11.8 kN. On the other hand, in the present invention, 184.4−160=24.4 kN, so that the pipe detachment prevention ability which is more than twice that of the conventional product and which has a margin is ensured. As described above, as compared to the conventional product, especially when the inclination angle is 2° to 3°, a stroke that enables stretching and contraction can be ensured, and the detachment preventing force for the pipe is improved.

(Description of Pipe Pulling Out)

Next, the behavior of the retaining ring 3A and the joint pipe 100 in the pipe retaining device 1A will be described with reference to FIGS. 5A to 7.

FIGS. 1 to 3 show the pipe retaining device 1A in which an opening nut 9c is mounted on the pair of projecting pieces 31, 31. This state is a state before tightening the retaining ring 3A (before diameter reduction) and before firmly tightening the connecting means 5 (before completion of screwing with the thread groove 53a). Thus, in this state, the fitting body 2 and the pressing ring 4A are not in contact with each other, and the packing 6 does not become deformed. In addition, the tooth portions 39 of the retaining ring 3A do not bite into the joint pipe 100.

Next, as shown in FIGS. 5A to 5C, the opening nut 9c is removed, and each flanged cap nut 52 is firmly tightened (finally tightened) to the T-shaped bolt 51 to connect the retaining ring 3A and the pressing ring 4A to the fitting body 2 (screwing with the thread groove 53a is completed). The end portion 53b of each cylindrical portion 53 comes into contact with the washer 55, and the pressing ring 4A presses the packing 6 against the receiving portion 21 to compress and deform the packing 6 and also comes into contact with the fitting body 2. On the other hand, the retaining ring 3A has not been tightened yet. At this time, the central axes of the respective connecting means 5 located at one ends of the elongated holes 33a and 33b of the retaining ring 3A coincide with the centers of the respective through holes 43 of the pressing ring connecting portions 42a and 42b. In addition, the center of the retaining ring 3A and the center of the pressing ring 4A also coincide with each other. Here, a maximum width (length) W1 in the pipe axis direction of each retaining ring connecting portion 32 is shorter than a length W2 of the cylindrical portion 53 (distance from the flange portion 54 to the cylindrical portion end portion 53b). Accordingly, a gap S is formed between the flange portions 54 and the first and second pressing ring connecting portions 42a and 42b at the first and second retaining ring connecting portions 32a and 32b. Therefore, it is not necessary to manually tighten (temporarily tighten) the connecting means 5 to temporarily fix the pipe before tightening and fixing the tightening means 9 of the retaining ring 3A as in the conventional art, and it is sufficient that the pressing ring 4A is merely firmly tightened (finally tightened), so that the work is simple, and the workability is good.

Figure 6A:
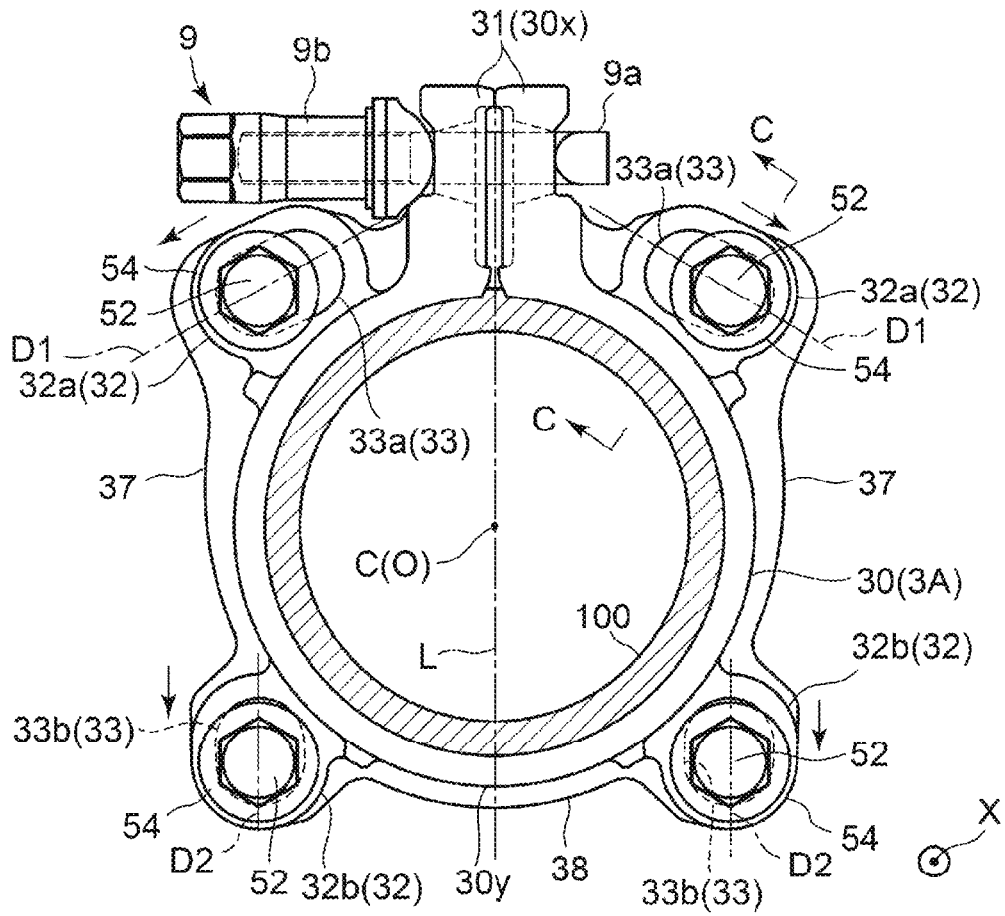
FIG. 6A is a diagram corresponding to FIG. 1 and showing a state after firm tightening of the connecting means and before tightening of the tightening means of the retaining ring.
Figure 6B:
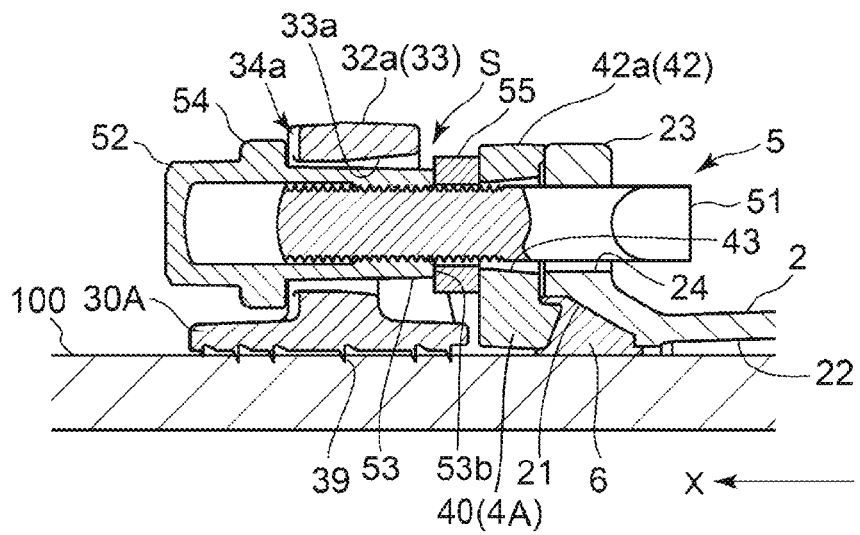
FIG. 6B is a cross-sectional view taken along a line C-C in FIG. 6A.

Then, as shown in FIGS. 6A and 6B,_after the pressing ring 4A is connected to the fitting body 2 by the connecting means 5, the tightening means 9 of the retaining ring 3A is tightened to reduce the diameter of the ring body 30A. Since the outer diameters of the cylindrical portions 53 are smaller than the diameters (widths) in the lateral direction of the elongated holes 33a and 33b, the flanged cap nuts 52 move relative to the ring body 30A along the longitudinal directions D1 and D2 within the elongated holes 33a and 33b.

Thus, the diameter reduction of the ring body 30A is guided along the oriented directions (longitudinal directions D1 and D2) of the elongated holes 33a and 33b, and the first and second retaining ring connecting portions 32a and 32b move so as to follow the diameter reduction of the ring body 30A. Then, the central axes of the respective connecting means 5 having moved from one ends to the other ends of the elongated holes 33a and 33b coincide with the centers of the respective through holes 43 of the pressing ring connecting portions 42a and 42b. In addition, the center of the retaining ring 3A reduced in diameter by tightening and the center of the pressing ring 4A also coincide with each other. Therefore, the connecting means 5 does not hinder the diameter reduction, and a load is not locally applied to the ring body 30A to cause cracks or the like.

Furthermore, due to the above-described gap S, the retaining ring connecting portions 32 and the pressing ring connecting portions 42 do not come into contact with each other when the diameter of the ring body 30A is reduced, so that no frictional resistance due to contact is generated. Therefore, the diameter reduction can be performed smoothly with low torque, so that the workability is good. Furthermore, since the retaining ring 3A is not fixed to the fitting body 2, and the first and second retaining ring connecting portions 32a and 32b and the flange portions 54 are separated from each other, the joint pipe 100 can be stretched and contracted.

Then, after the retaining ring 3A is connected and fixed, when a pipe pulling force F is generated in the pipe axis direction X at the joint pipe 100, the joint pipe 100 is stretched, and the retaining ring 3A becomes separated from the pressing ring 4A (washer 55). Since the outer diameters of the flange portions 54 is larger than the diameters of the elongated holes 33a and 33b, the flange portions 54 come into contact with the first and second retaining ring connecting portions 32a and 32b, so that the joint pipe 100 is prevented from being pulled out. In the present embodiment, upper ends 56a (circumferential end portion 30x side) of the first surfaces 56 of the flange portions 54 first come into contact with the first retaining ring connecting portions 32a.

Figure 7:
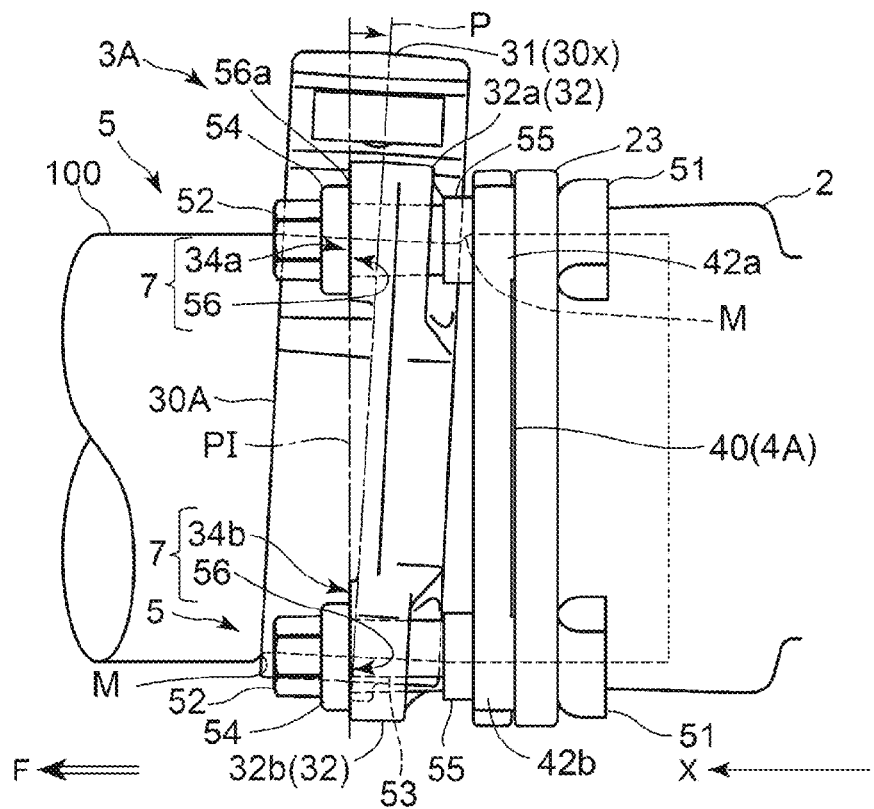
FIG. 7 is a diagram corresponding to FIG. 2 and showing a state where a pipe pulling force is applied to a joint pipe and the retaining ring is inclined.

Here, in the present embodiment, the space (interval B) formed at the first surface 56 of the flange portion 54 of the flanged cap nut 52 is larger at the second surface 34b of each second retaining ring connecting portion 32b than at the second surface 34a of each first retaining ring connecting portion 32a, and is larger at the lower portion (circumferential center portion 30y) than at the upper portion (circumferential end portion 30x side). As described above, between the first surface 56 of the flange portion 54 and the inclined plane PI including the second surfaces 34a and 34b, a space (gap) is formed such that the interval B therebetween becomes larger from the circumferential end portions 30x toward the circumferential center portion 30y. Thus, when the pipe pulling force F is further applied, as shown in FIG. 7, due to the interval B (space) and the inclined plane PI (second surfaces 34a and 34b), the retaining ring 3A is inclined with the upper ends 56a as a base such that each circumferential end portion 30x is caused to be closer to the fitting body 2 and the circumferential center portion 30y is moved away from the fitting body 2. Then, the ring body 30A comes into contact with the joint pipe 100 to deform (bend) the joint pipe 100. A formed deformed portion M opposes the pipe pulling force F, so that it is possible to greatly improve the detachment preventing force for the pipe.

Furthermore, whereas the tooth portions 39 of the retaining ring 3A more deeply bite into the joint pipe 100 on the circumferential end portion 30x side where the tightening means 9 is located, than in the vicinity of the circumferential center portion 30y, the biting of the tooth portions 39 is shallow in the vicinity of the circumferential center portion 30y. When a pipe pulling force F is generated at the retaining ring 3A, since the biting of the tooth portions 39 is shallow in the vicinity of the circumferential center portion 30y, slip of the joint pipe 100 occurs at this portion, so that the pipe detachment preventing force is decreased. Therefore, by inclining the retaining ring 3A with the upper ends 56a side as a base, the retaining ring 3A can be relatively easily inclined to form the deformed portion M in the joint pipe 100, so that the detachment preventing force for the pipe can be further improved. In addition, due to the inclination of the retaining ring 3A, the tooth portions 39 at the circumferential center portion 30y further bite into the joint pipe 100, so that the pipe detachment preventing force is further improved.

It should be noted that by forming the second surfaces 34a and 34b of the retaining ring connecting portion 32 as flat surfaces and forming the first surfaces 56 of the flange portions 54 as inclined surfaces, it is also conceivable to incline the retaining ring 3A in the same manner as described above to deform the joint pipe 100. However, in this case, it is difficult to screw the T-shaped bolt 51 and the flanged cap nut 52 such that the first surface 56 of each flange portion 54 is located within the same inclined plane PI. Therefore, in the inclination mechanism 7 of the present invention, the first surface 56 of each flange portion 54 is formed as a flat surface, and the second surface 34 of each retaining ring connecting portion 32 is formed as an inclined surface.

Second Embodiment

Next, a second embodiment of the present invention will be described with reference to FIGS. 8 to 12. It should be noted that the same members as those of the above-described embodiment are designated by the same reference characters.

In the above embodiment, the connection to the fitting body 2 is made by the connecting means 5 at the retaining ring connecting portions 32 (first and second retaining ring connecting portions 32a and 32b) at the four locations. However, the retaining ring connecting portions 32 of a retaining ring 3B according to the second embodiment include a pair of first retaining ring connecting portions 32a, 32a and one second retaining ring connecting portion 32b1 at three locations. It should be noted that in the present embodiment, the nominal diameter of the joint pipe 100 is, for example, 100.

Figure 8:
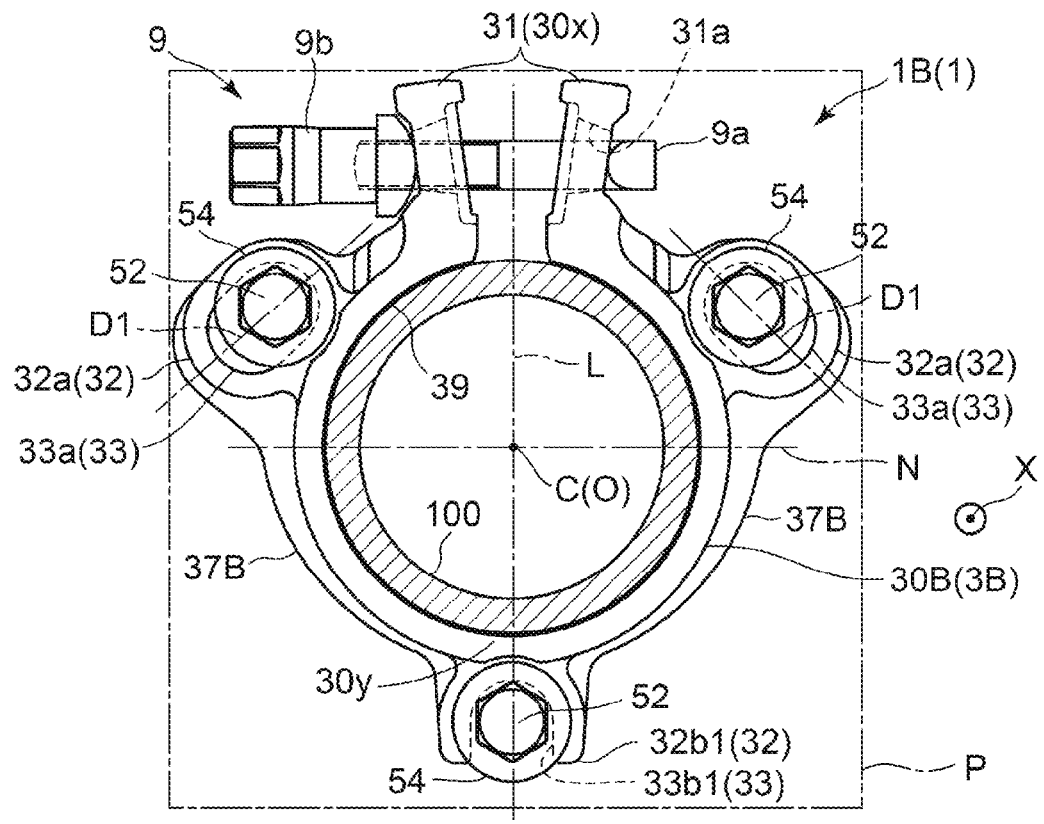
FIG. 8 is a front view of a pipe retaining device according to a second embodiment of the present invention.
Figure 9:
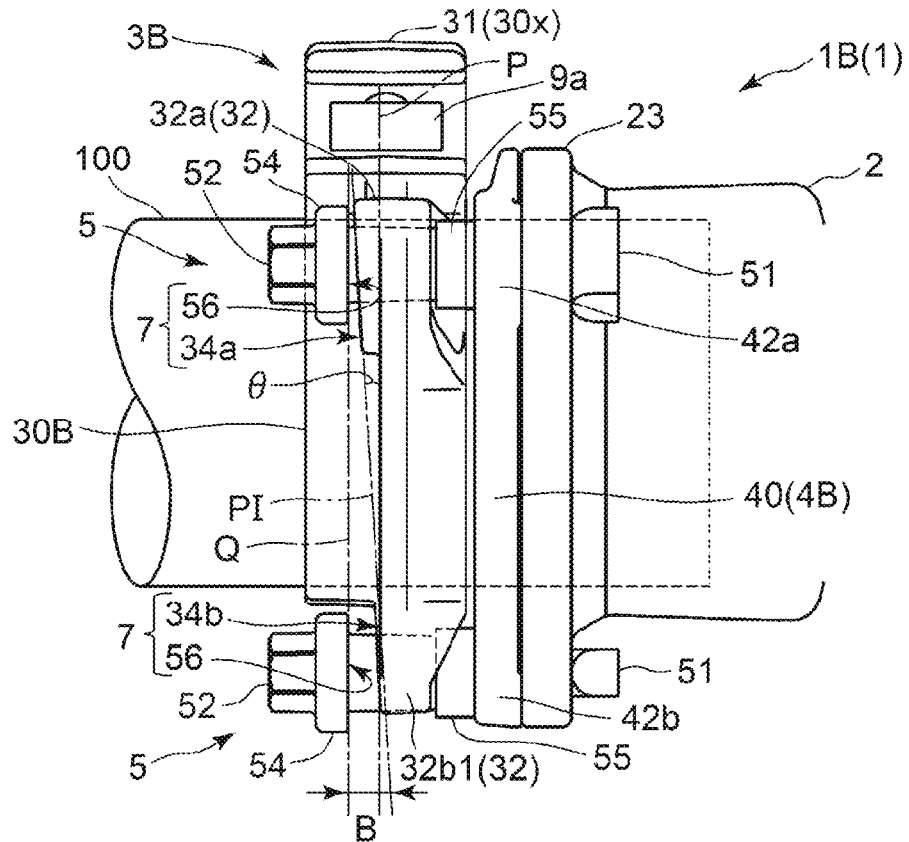
FIG. 9 is a side view of FIG. 8.
Figure 10:
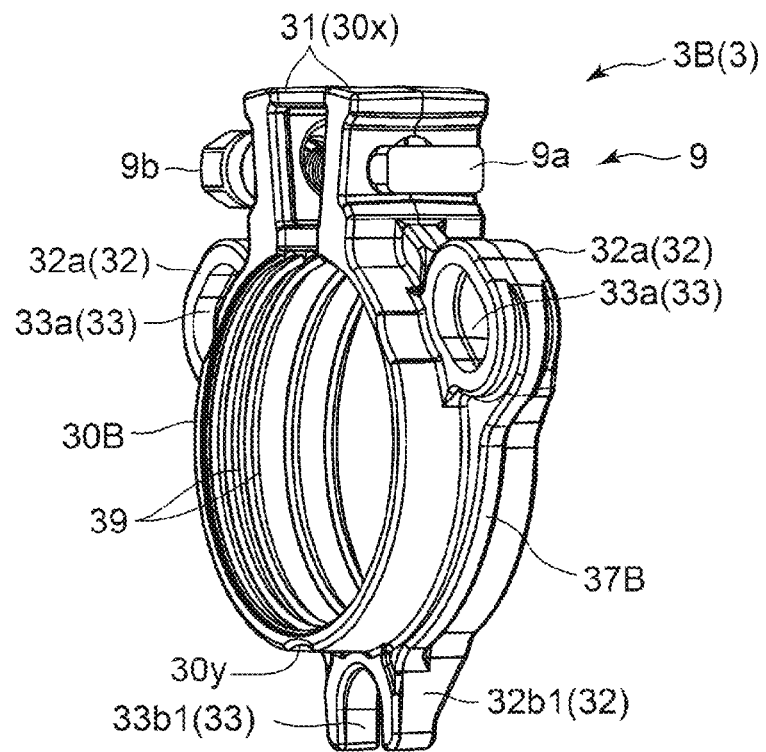
FIG. 10 is a perspective view of a retaining ring of the second embodiment.

As shown in FIGS. 8 to 10, the second retaining ring connecting portion 32b1 is located at the circumferential center portion 30y of a ring body 30B, and a recess 33b1 is formed therein as a second retaining ring penetration portion so as to be open on one side thereof. The recess 33b1 has a smaller width than the flange portion 54 and extends along the center line L. The second surfaces 34a and 34b, facing the flange portions 54, of the first and second retaining ring connecting portions 32a and 32b1 are located within the same inclined plane PI inclined in the pipe axis direction X at an inclination angle θ with respect to the reference plane P. It should be noted that it is sufficient that the inclined plane PI is inclined at an inclination angle θ that is greater than 0° and not greater than 5° with respect to the reference plane P. Preferably, the inclination angle θ is not less than 1° and not greater than 5°. In the present embodiment as well, the space (interval B) formed at the first surface 56 of the flange portion 54 of the flanged cap nut 52 is larger at the second surface 34*b* of the second retaining ring connecting portion 32*b*1 than at the second surface 34*a* of each first retaining ring connecting portion 32*a*, and is larger at the lower portion (circumferential center portion 30*y*) than at the upper portion (circumferential end portion 30*x* side).

Figure 11:
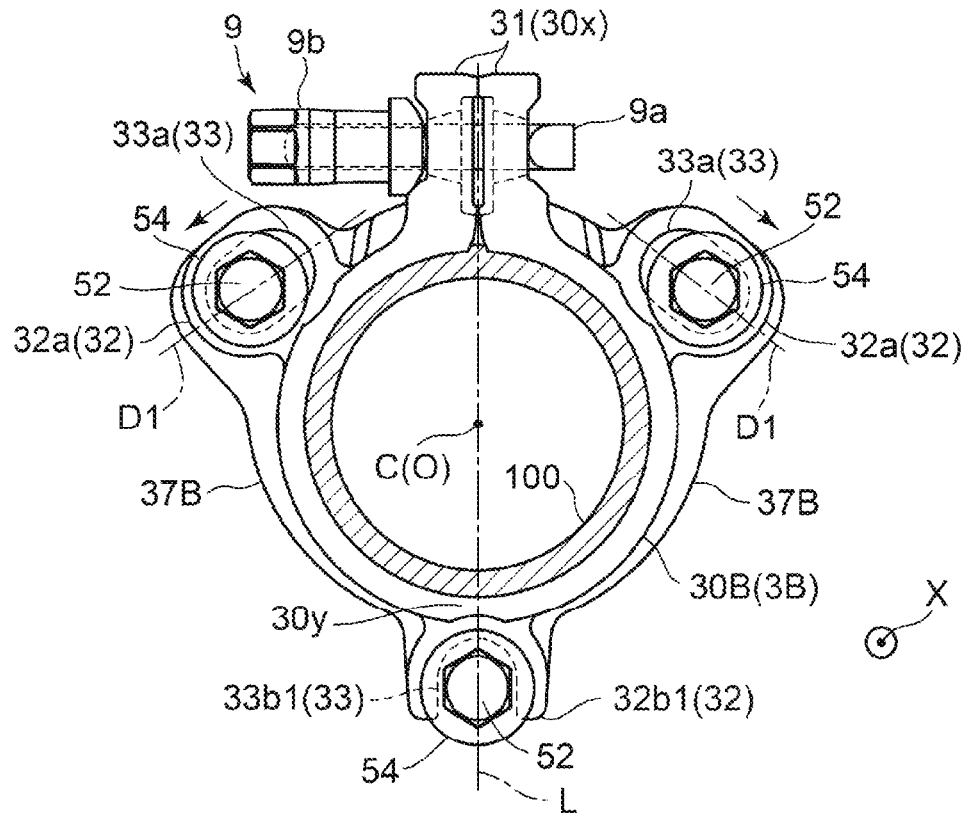
FIG. 11 is a diagram corresponding to FIG. 6A in the second embodiment.

As shown in FIG. 11, in the present embodiment as well, after a pressing ring 4B is tightened and fixed to the fitting body 2 by the connecting means 5, the tightening means 9 of the retaining ring 3B can be tightened to reduce the diameter of the ring body 30B. In the present embodiment, the flanged cap nuts 52 slide along the longitudinal direction D1 within the elongated holes 33*a*. On the other hand, at the circumferential center portion 30*y*, the diameter of the ring body 30B is reduced toward the center of the ring body 30B, and the amount of the diameter reduction is small, so that the flanged cap nut 52 slightly slides along the center line L in the recess 33*b*1. Therefore, the connecting means 5 does not hinder the diameter reduction and does not come off from the recess 33*b*1. Instead of the recess 33*b*1 which is open on the outer side thereof, an elongated hole may be formed along the center line L.

Figure 12:
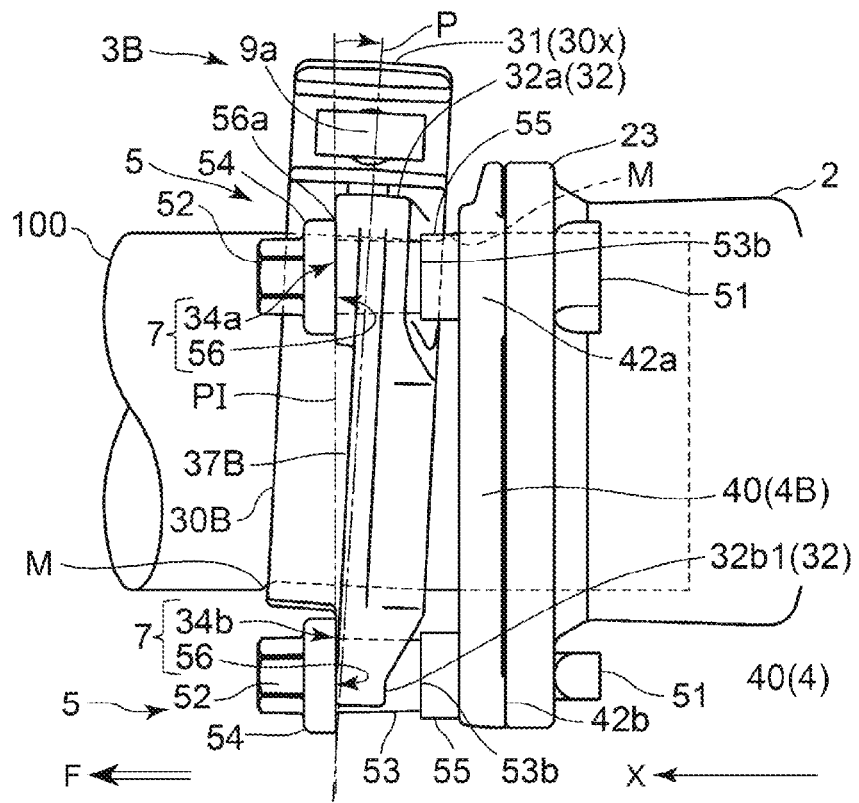
FIG. 12 is a diagram corresponding to FIG. 7 in the second embodiment.

Moreover, when the pipe pulling force F is further applied, as shown in FIG. 12, the retaining ring 3B is inclined with the upper ends 56*a* as a base due to the interval B (space) and the inclined plane PI (second surfaces 34*a* and 34*b*) shown in FIG. 9. Then, the ring body 30B comes into contact with the joint pipe 100 to deform (bend) the joint pipe 100. A formed deformed portion M opposes the pipe pulling force F, and the tooth portions 39 at the circumferential center portion 30*y* further bite into the joint pipe 100, so that it is possible to greatly improve the detachment preventing force for the pipe.

Third Embodiment

Moreover, in a third embodiment shown in FIGS. 13 to 17, the retaining ring connecting portions 32 of a retaining ring 3C include only a pair of first retaining ring connecting portions 32*a*2 and 32*a*2 at two locations. It should be noted that in the present embodiment, the nominal diameter of the joint pipe 100 is, for example, 50 or 75.

Figure 13:
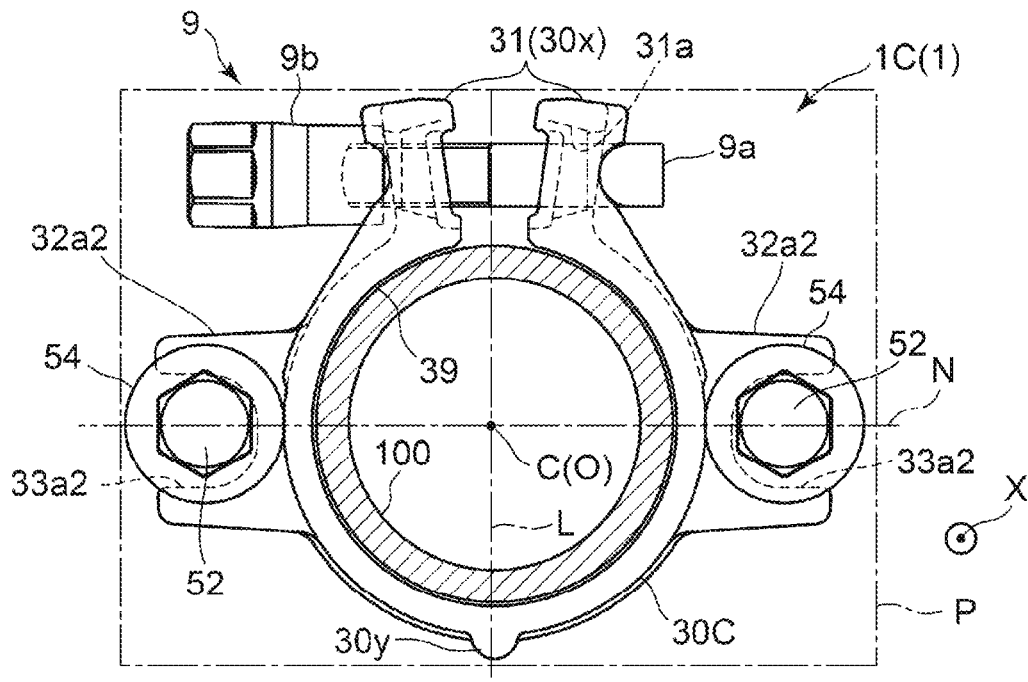
FIG. 13 is a front view of a pipe retaining device according to a third embodiment of the present invention.
Figure 14:
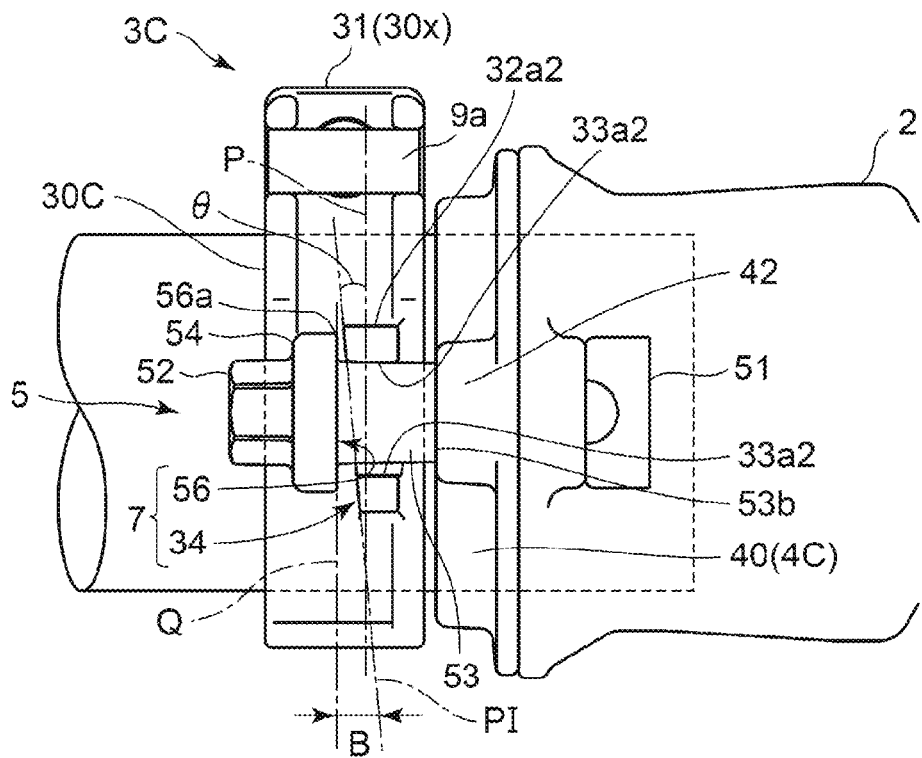
FIG. 14 is a side view of FIG. 13.
Figure 15:
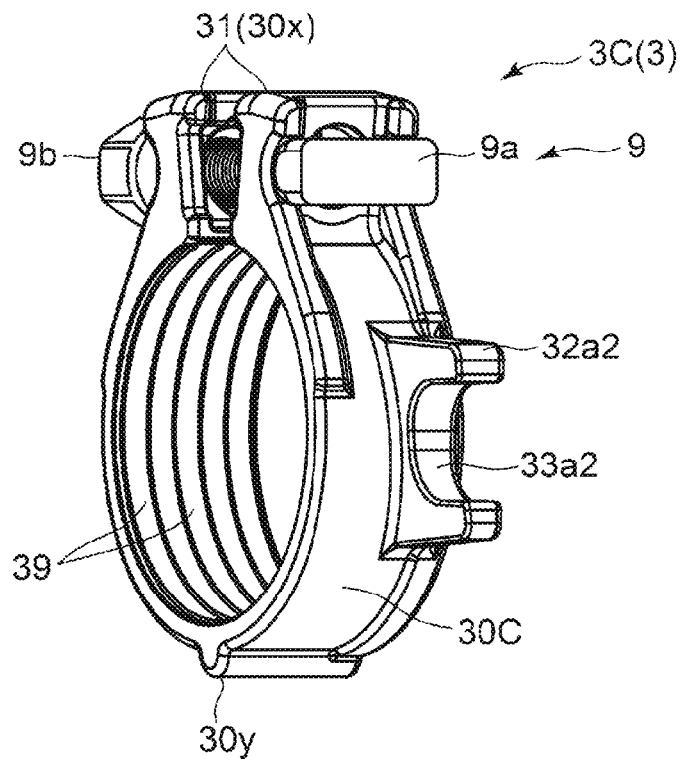
FIG. 15 is a perspective view of a retaining ring of the third embodiment.

As shown in FIGS. 13 to 15, the pair of first retaining ring connecting portions 32*a*2 and 32*a*2 are each located at an intermediate portion between the circumferential center portion 30*y* and the circumferential end portion 30*x* of a ring body 30C, and are arranged so as to be line-symmetrical with respect to the center line L. In addition, a recess 33*a*2 is formed as a first retaining ring penetration portion in each first retaining ring connecting portion 32*a*2 so as to be open on the outer side thereof. The recess 33*a*2 has a smaller width than the flange portion 54. In the present embodiment, the second surfaces 34, facing the flange portions 54, of the first retaining ring connecting portions 32*a*2 are located within the same inclined plane PI inclined in the pipe axis direction X at an inclination angle θ with respect to the reference plane P. It should be noted that it is sufficient that the inclined plane PI is inclined at an inclination angle θ that is greater than 0° and not greater than 10° with respect to the reference plane P. Preferably, the inclination angle θ is not less than 1° and not greater than 6°. In the present embodiment, the space (interval B) formed between the first surface 56 of the flange portion 54 of the flanged cap nut 52 and the second surface 34 of the first retaining ring connecting portion 32*a*2 is larger at the lower portion (circumferential center portion 30*y*) than at the upper portion (circumferential end portion 30*x* side).

Figure 16:
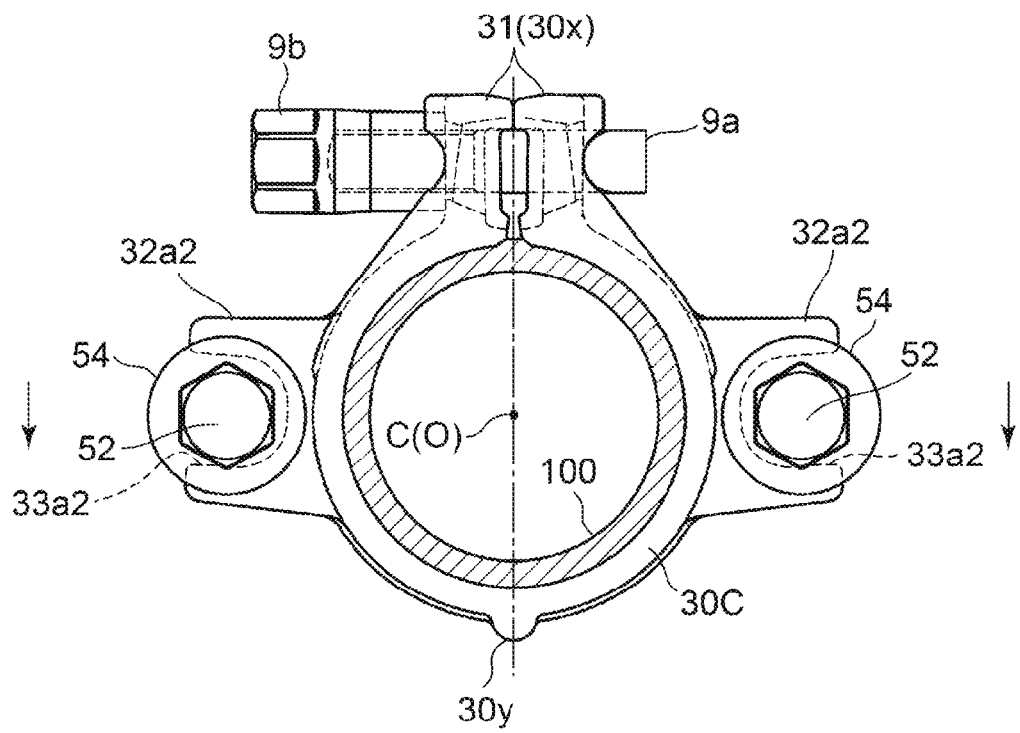
FIG. 16 is a diagram corresponding to FIG. 6A in the third embodiment.

As shown in FIG. 16, in the present embodiment as well, after a pressing ring 4C is tightened and fixed to the fitting body 2 by the connecting means 5, the tightening means 9 of the retaining ring 3C can be tightened to reduce the diameter of the ring body 30C. In the present embodiment, the flanged cap nuts 52 slide along the center line L within the recesses 33*a*2. Therefore, the connecting means 5 does not hinder the diameter reduction and does not come off from each recess 33*a*2. Instead of the recess 33*a*2 which is open on the outer side thereof, an elongated hole may be formed along the center line L. In addition, in the present embodiment, the opening width of the recess 33*a*2 and the width of the inner portion of the recess 33*a*2 are equal to each other, but the recess 33*a*2 may be formed such that the opening width is smaller than the width of the inner portion (the shape of the recess is substantially a C-shape as viewed in the pipe axis direction). The shape of the recess 33*a*2 is not limited to the shape in the present embodiment as long as the shape is a shape that allows the flanged cap nut 52 to slide within the recess 33*a*2.

Figure 17:
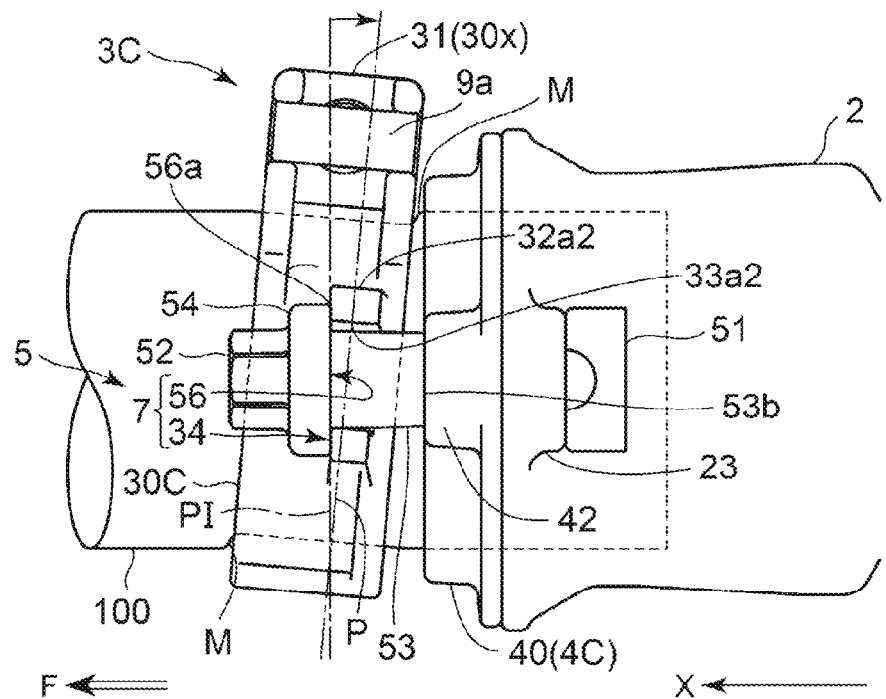
FIG. 17 is a diagram corresponding to FIG. 7 in the third embodiment.

Moreover, when the pipe pulling force F is further applied, as shown in FIG. 17, the retaining ring 3C is inclined with the upper ends 56*a* as a base due to the interval B (space) and the inclined plane PI (second surfaces 34*a*) shown in FIG. 14. Then, the ring body 30C *comes* into contact with the joint pipe 100 to deform (bend) the joint pipe 100. A formed deformed portion M opposes the pipe pulling force F, and the tooth portions 39 at the circumferential center portion 30*y* further bite into the joint pipe 100, so that it is possible to greatly improve the detachment preventing force for the pipe.

Fourth Embodiment

Furthermore, in a fourth embodiment shown in FIGS. 18 to 22, the retaining ring connecting portions 32 of a retaining ring 3D include a pair of first retaining ring connecting portions 32*a*, 32*a*, a pair of second retaining ring connecting portions 32*b*2, 32*b*2, and a pair of third retaining ring connecting portions 32*c*, 32*c* at six locations, and the respective connecting portions are arranged in pairs so as to be line-symmetrical with respect to the center line L. It should be noted that in the present embodiment, the nominal diameter of the joint pipe 100 is, for example, 250.

Figure 18:
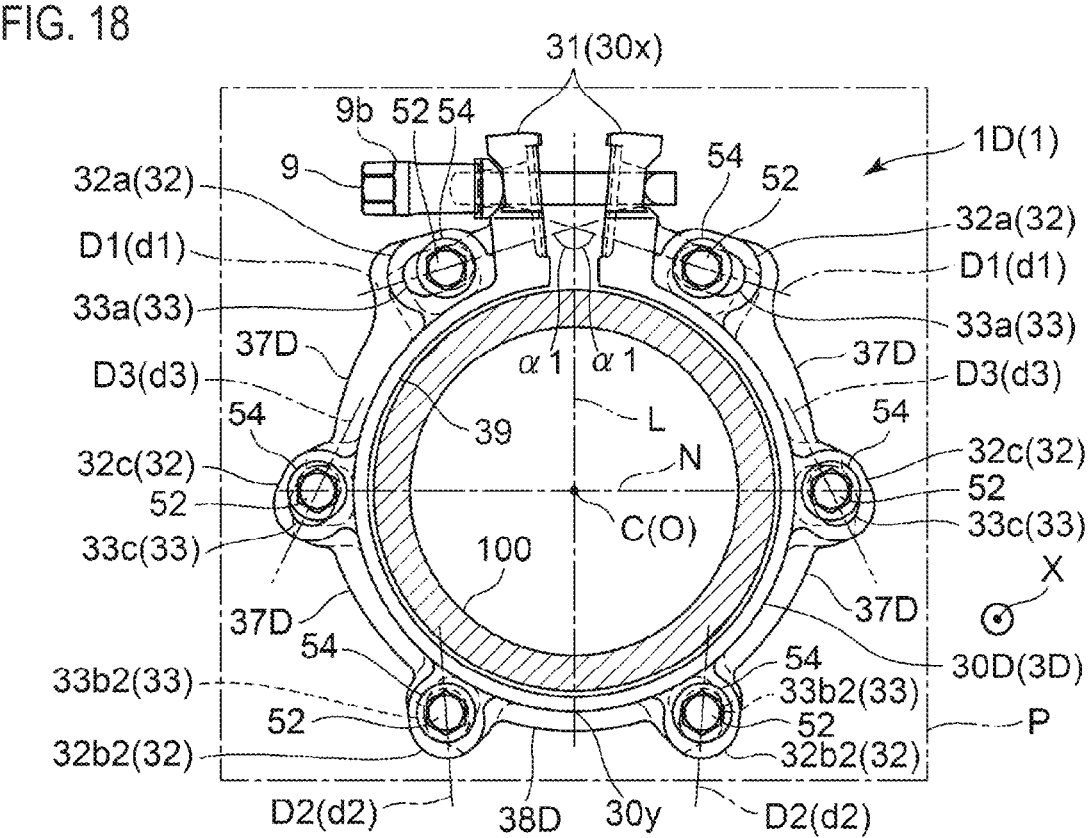
FIG. 18 is a front view of a pipe retaining device according to a fourth embodiment of the present invention.
Figure 19:
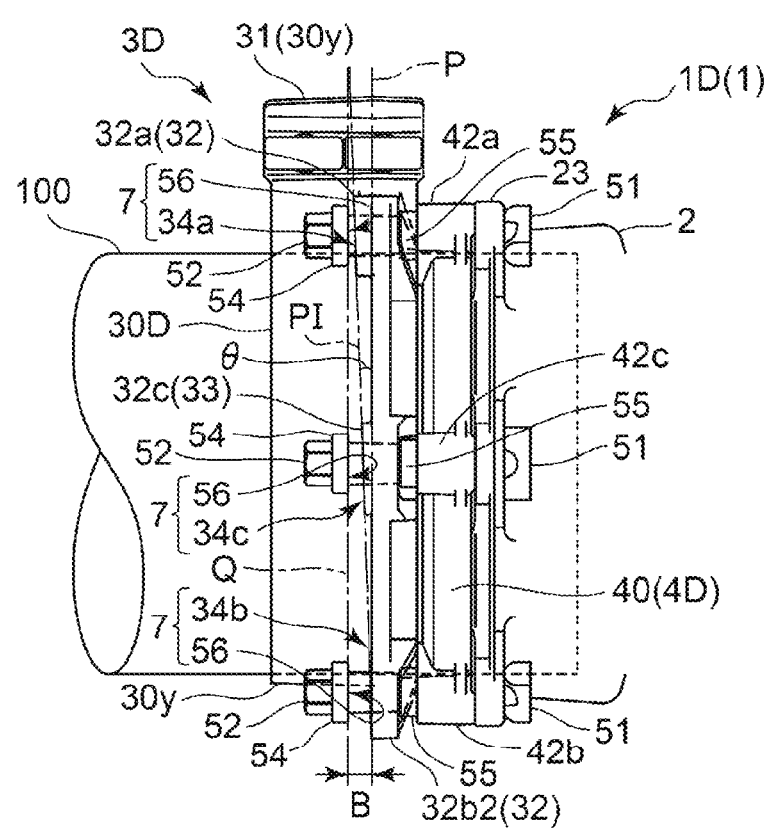
FIG. 19 is a side view of FIG. 18.
Figure 20:
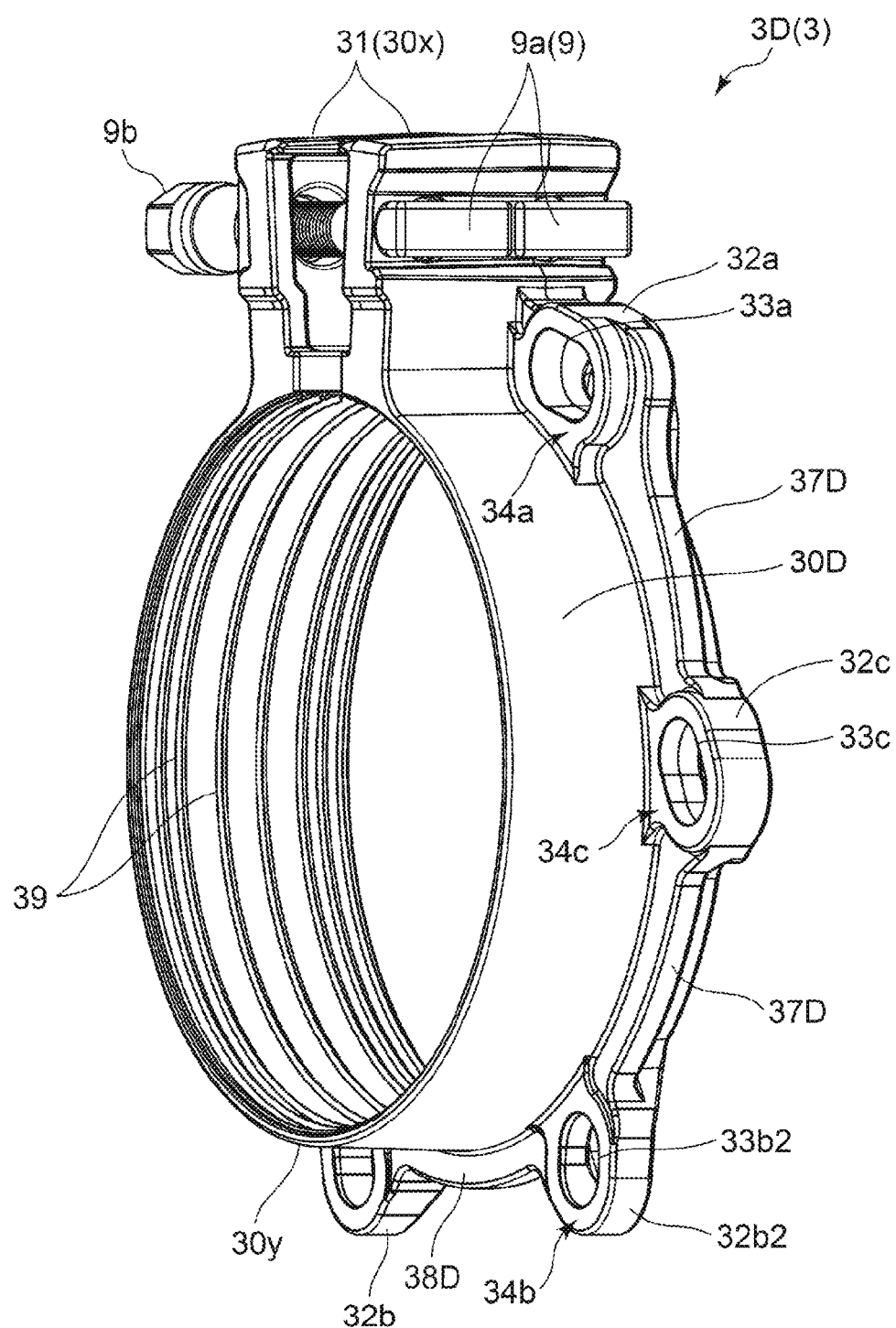
FIG. 20 is a perspective view of a retaining ring of the fourth embodiment.

As shown in FIGS. 18 to 20, each second retaining ring connecting portion 32*b*2 is located in the vicinity of the circumferential center portion 30*y* of a ring body 30D. In addition, each third retaining ring connecting portion 32*c* is provided at the center between the first retaining ring connecting portion 32*a* and the second retaining ring connecting portion 32*b*2 (position shifted by 90° in the circumferential direction of the ring body 30 from the circumferential center portion 30*y* of the ring body 30C). The second retaining ring connecting portions 32*b*2 and the third retaining ring connecting portions 32*c* are provided with elongated holes 33*b*2 and 33*c* having a smaller width than the flange portion 54. The first retaining ring connecting portions 32*a* have the same configuration as in the above first embodiment.

Here, the longitudinal direction D1 (center line d1) of the elongated hole 33*a* of each first retaining ring connecting portion 32*a* and a longitudinal direction D3 (center line d3) of the elongated hole 33*c* of each third retaining ring connecting portion 32*c* are oriented toward the projecting piece 31 and intersect the center line L. In addition, an intersection angle α1 of the center line d1 with respect to the center line L is larger than the intersection angle of the center line d3 with respect to the center line L. On the other hand, the longitudinal direction D2 (center line d2) of the elongated hole 33b2 of each second retaining ring connecting portion 32b2 is oriented toward the third retaining ring connecting portion 32c, and the oriented direction thereof is opposite to those of the above center lines d1 and d3. In addition, the center line d2 is substantially parallel to the center line L, and thus the intersection angle thereof with respect to the center line L is very small as compared to the intersection angle of the center line d3 with respect to the center line L.

The second surfaces 34a, 34b, and 34c, facing the flange portions 54, of the respective retaining ring connecting portions 32a, 32b2, and 32c are located within the same inclined plane PI inclined in the pipe axis direction X at an inclination angle θ with respect to the reference plane P. It should be noted that it is sufficient that the inclined plane PI is inclined at an inclination angle θ that is greater than 0° and not greater than 5° with respect to the reference plane P. Preferably, the inclination angle θ is not less than 1° and not greater than 4°. In the present embodiment as well, the space (interval B) formed between each retaining ring connecting portion (inclined plane PI) and the first surface 56 of the flange portion 54 is larger in the order of the second surface 34a of each first retaining ring connecting portion 32a, the second surface 34c of each third retaining ring connecting portion 32c, and the second surface 34b of each second retaining ring connecting portion 32b2, and is larger at the lower portion (circumferential center portion 30y) than at the upper portion (circumferential end portion 30x side).

Figure 21:
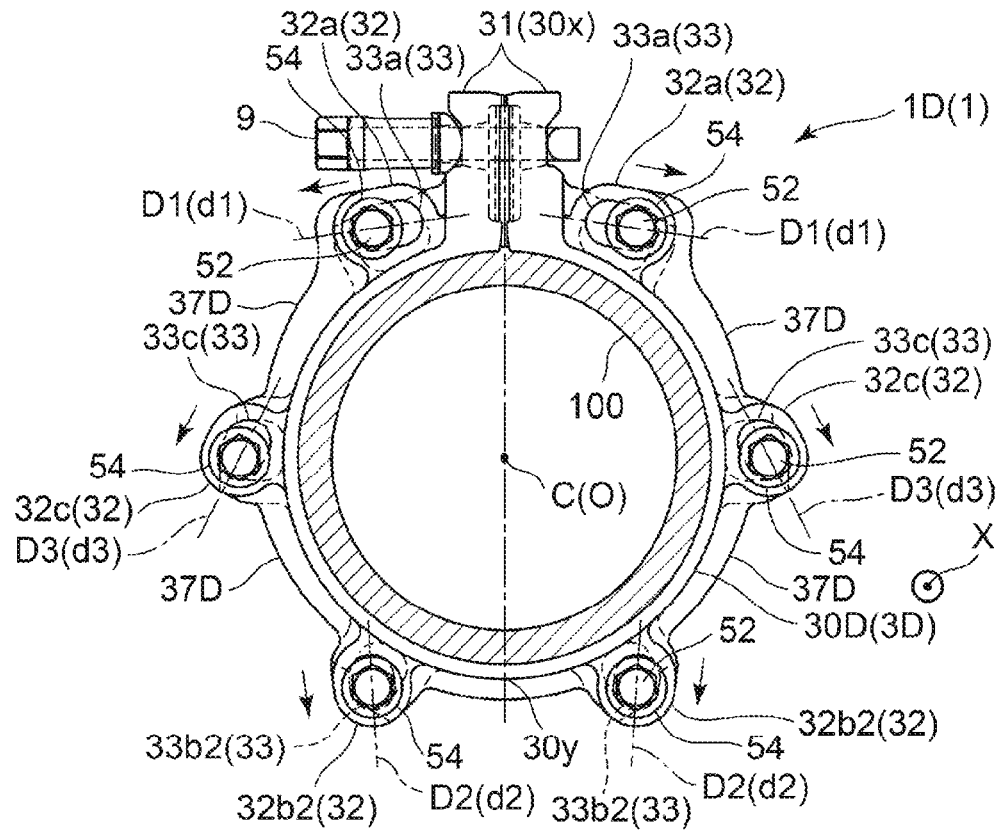
FIG. 21 is a diagram corresponding to FIG. 6A in the fourth embodiment.

As shown in FIG. 21, in the present embodiment as well, after a pressing ring 4D is tightened and fixed to the fitting body 2 by the connecting means 5, the tightening means 9 of the retaining ring 3D can be tightened to reduce the diameter of the ring body 30D. In the present embodiment, in a state where the retaining ring 3D has not been tightened yet, the central axes of the connecting means 5 located at one ends of the elongated holes 33a, 33b2, and 33c of the retaining ring 3D coincide with the centers of the respective through holes of the pressing ring connecting portions 42a, 42b, and 42c. In addition, the center of the retaining ring 3D and the center of the pressing ring 4D also coincide with each other. Then, when the retaining ring 3D is tightened by the tightening means 9, the flanged cap nuts 52 slide along the respective longitudinal directions D1 to D3 within the elongated holes 33a, 33b2, and 33c. Thus, the diameter reduction of the ring body 30D is guided along the oriented directions (longitudinal directions D1, D2, and D3) of the elongated holes 33a, 33b2, and 33c, and the respective retaining ring connecting portions 32a, 32b2, and 32c move so as to follow the diameter reduction of the ring body 30D. Then, the central axes of the respective connecting means 5 having moved from one ends to the other ends of the elongated holes 33a, 33b2, and 32c coincide with the centers of the respective through holes of the pressing ring connecting portions 42a, 42b, and 42c. In addition, the center of the retaining ring 3D reduced in diameter by tightening and the center of the pressing ring 4D also coincide with each other. Therefore, the connecting means 5 does not hinder the diameter reduction, and a load is not locally applied to the ring body 30D to cause cracks or the like.

Figure 22:
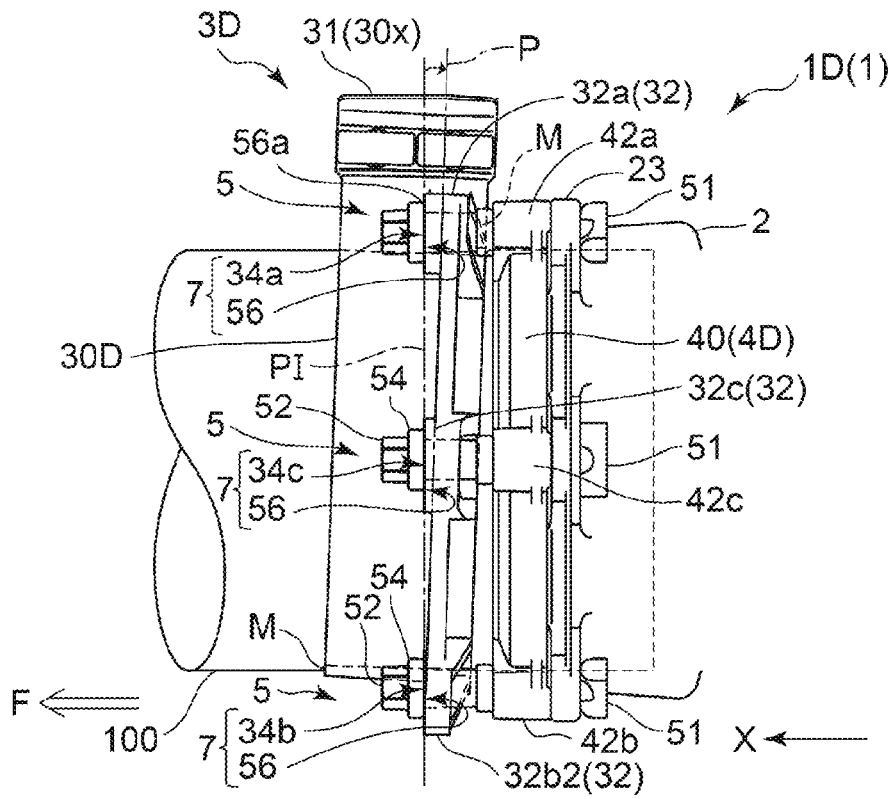
FIG. 22 is a diagram corresponding to FIG. 7 in the fourth embodiment.

Moreover, when the pipe pulling force F is further applied, as shown in FIG. 22, the retaining ring 3D is inclined with the upper ends 56a as a base due to the interval B (space) and the inclined plane PI (second surfaces 34a, 34b, and 34c). Then, the ring body 30D comes into contact with the joint pipe 100 to deform (bend) the joint pipe 100.

A formed deformed portion M opposes the pipe pulling force F, and the tooth portions 39 at the circumferential center portion 30y further bite into the joint pipe 100, so that it is possible to greatly improve the detachment preventing force for the pipe.

Fifth Embodiment

Furthermore, in a fifth embodiment shown in FIGS. 23 to 27, the retaining ring connecting portions 32 of a retaining ring 3E include a pair of first retaining ring connecting portions 32a, 32a, a second retaining ring connecting portion 32b3 located at the circumferential center portion 30y of a ring body 30E, and a pair of third retaining ring connecting portions 32c1, 32c1 at five locations, and the respective connecting portions are arranged in pairs so as to be line-symmetrical with respect to the center line L. It should be noted that in the present embodiment, the nominal diameter of the joint pipe 100 is, for example, 250 or 300.

Figure 23:
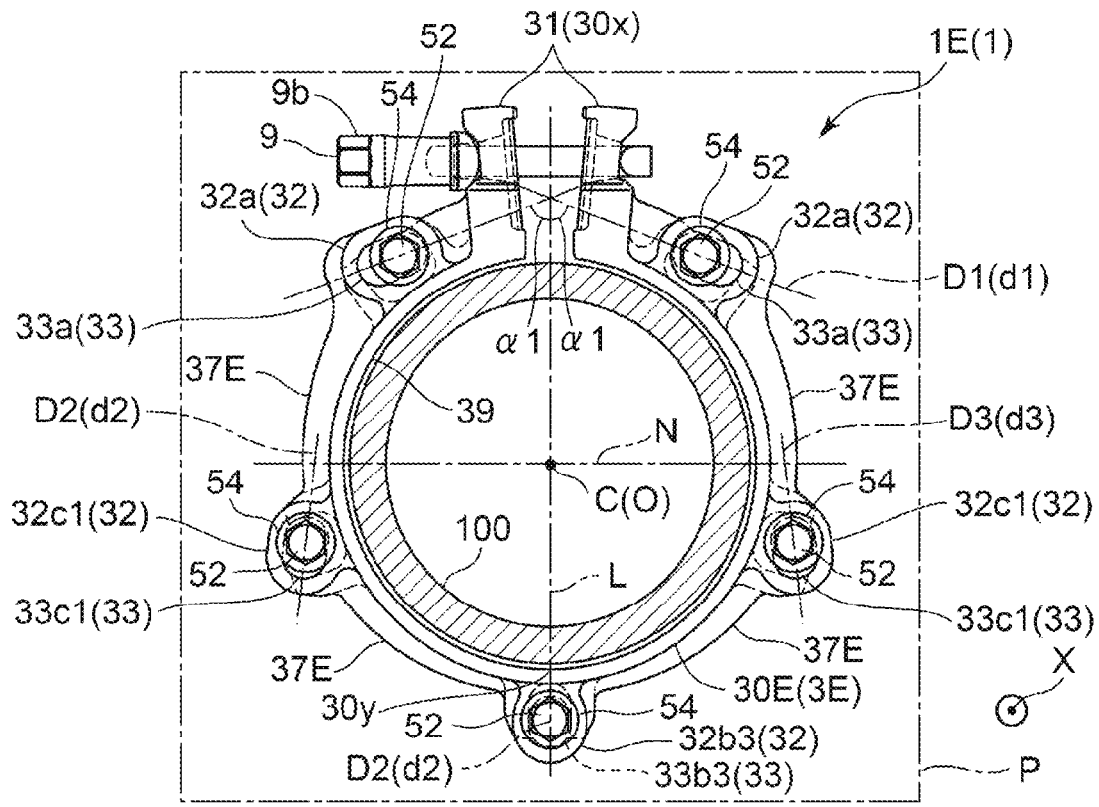
FIG. 23 is a front view of a pipe retaining device according to a fifth embodiment of the present invention.
Figure 24:
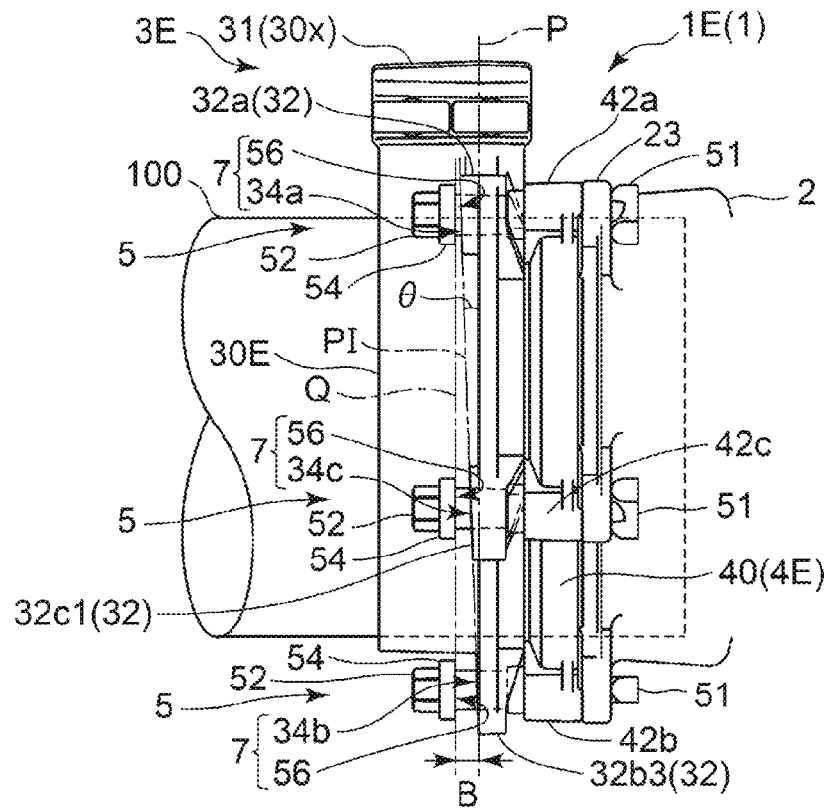
FIG. 24 is a side view of FIG. 23.
Figure 25:
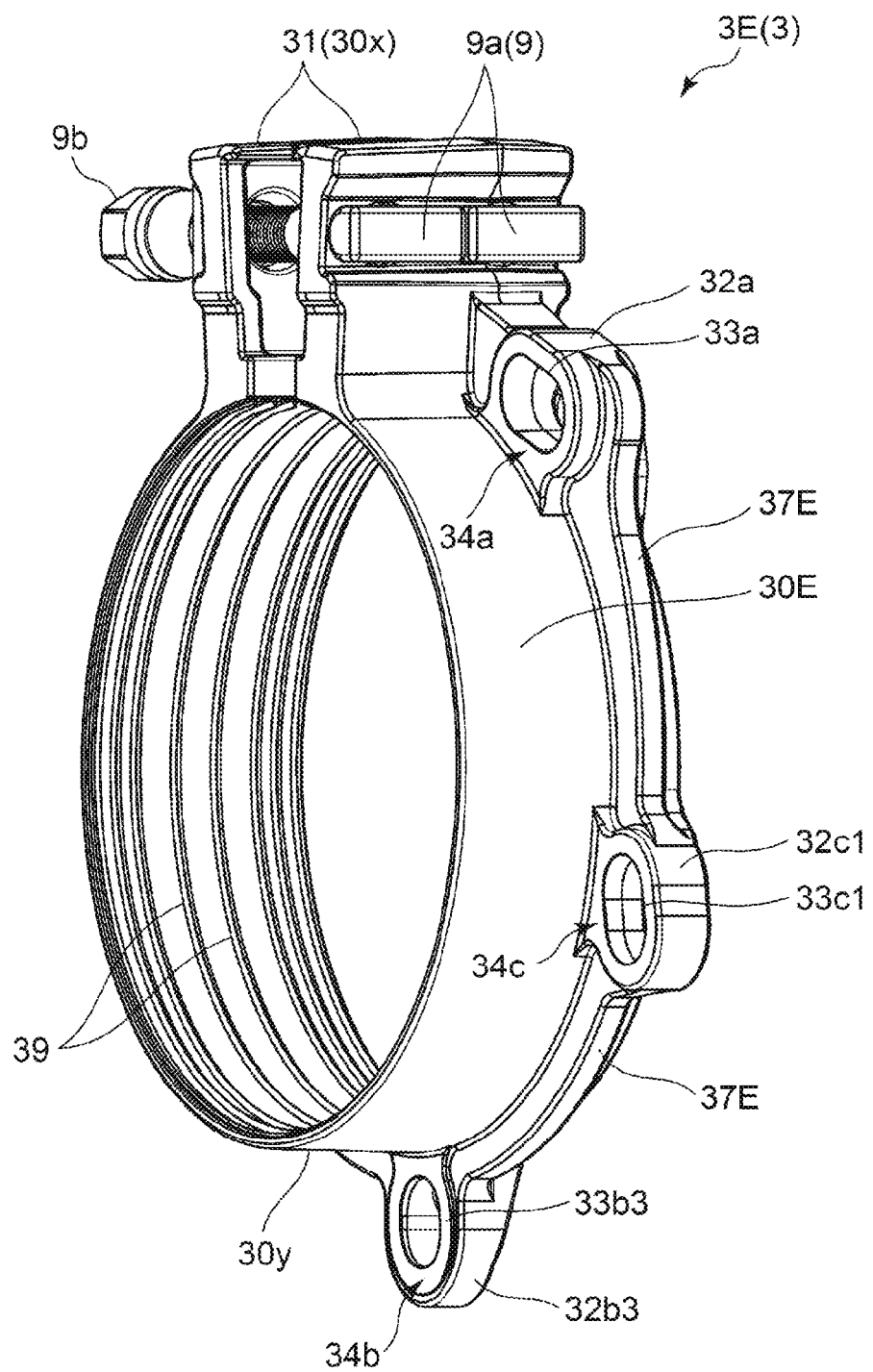
FIG. 25 is a perspective view of a retaining ring of the fifth embodiment.

As shown in FIGS. 23 to 25, each third retaining ring connecting portion 32c1 is provided at the middle (center) between the first retaining ring connecting portion 32a and the second retaining ring connecting portion 32b3. The second retaining ring connecting portion 32b3 and the third retaining ring connecting portions 32c1 are provided with elongated holes 33b3 and 33c1 having a smaller width than the flange portion 54. It should be noted that the first retaining ring connecting portions 32a have the same configuration as in the above second embodiment.

Here, the longitudinal direction D1 (center line d1) of the elongated hole 33a of each first retaining ring connecting portion 32a and a longitudinal direction D3 (center line d3) of the elongated hole 33c1 of each third retaining ring connecting portion 32c1 are oriented toward the projecting piece 31 and intersect the center line L. In addition, an intersection angle α1 of the center line d1 with respect to the center line L is larger than the intersection angle of the center line d3 with respect to the center line L. On the other hand, the longitudinal direction D2 (center line d2) of the elongated hole 33bb of the second retaining ring connecting portion 32b3 coincides with the center line L.

The second surfaces 34a, 34b, and 34c, facing the flange portions 54, of the respective retaining ring connecting portions 32a, 32b3, and 32c1 are located within the same inclined plane PI inclined in the pipe axis direction X at an inclination angle θ with respect to the reference plane P. It should be noted that it is sufficient that the inclined plane PI is inclined at an inclination angle θ that is greater than 0° and not greater than 5° with respect to the reference plane P. Preferably, the inclination angle θ is not less than 1° and not greater than 4°. In the present embodiment as well, the space (interval B) formed between each retaining ring connecting portion (inclined plane PI) and the first surface 56 of the flange portion 54 is larger in the order of the second surface 34a of each first retaining ring connecting portion 32a, the second surface 34c of each third retaining ring connecting portion 32c, and the second surface 34b of the second retaining ring connecting portion 32b3, and is larger at the lower portion (circumferential center portion 30y) than at the upper portion (circumferential end portion 30x side).

Figure 26:
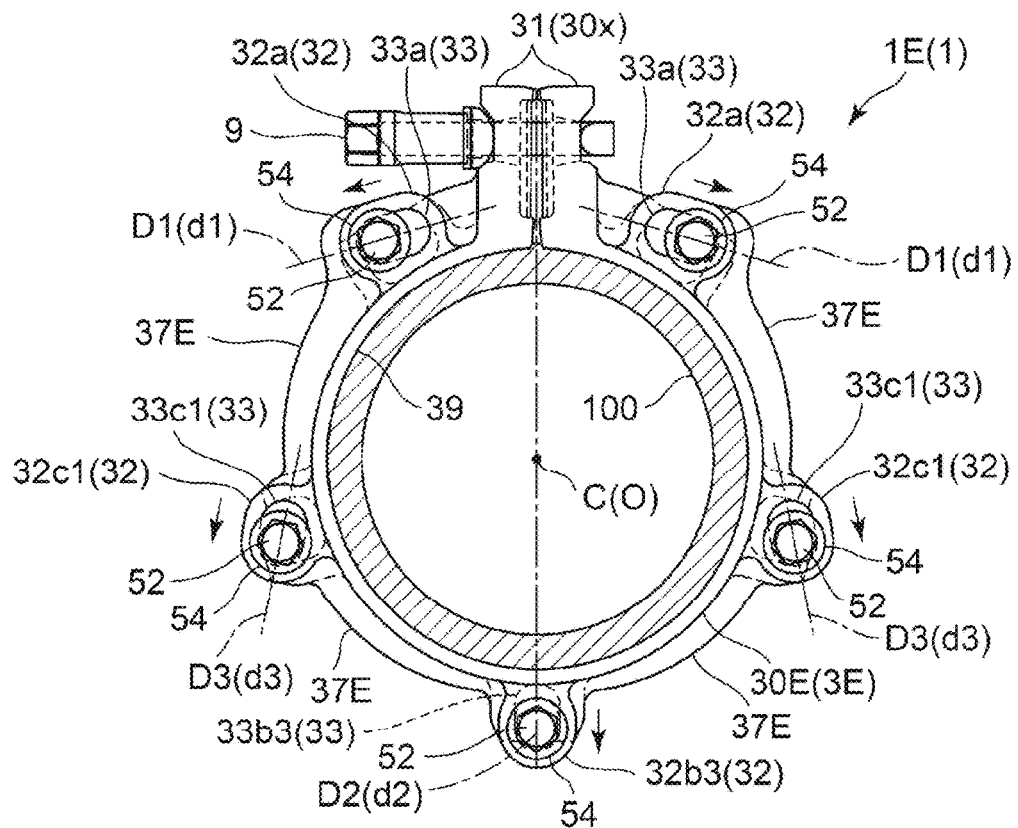
FIG. 26 is a diagram corresponding to FIG. 6A in the fifth embodiment.

As shown in FIG. 26, in the present embodiment as well, after a pressing ring 4E is tightened and fixed to the fitting body 2 by the connecting means 5, the tightening means 9 of the retaining ring 3E can be tightened to reduce the diameter of the ring body 30E. In the present embodiment, in a state where the retaining ring 3E has not been tightened yet, the central axes of the connecting means 5 located at one ends of the elongated holes 33a, 33b3, and 33c1 of the retaining ring 3E coincide with the centers of the respective through holes of the pressing ring connecting portions 42a, 42b, and 42c. In addition, the center of the retaining ring 3E and the center of the pressing ring 4E also coincide with each other. Then, when the retaining ring 3E is tightened by the tightening means 9, the flanged cap nuts 52 slide along the respective longitudinal directions D1 to D3 within the elongated holes 33a, 33b3, and 33c1. Thus, the diameter reduction of the ring body 30E is guided along the oriented directions (longitudinal directions D1, D2, and D3) of the elongated holes 33a, 33b3, and 33c1, and the respective retaining ring connecting portions 32a, 32b3, and 33c1 move so as to follow the diameter reduction of the ring body 30E. Then, the central axes of the respective connecting means 5 having moved from one ends to the other ends of the elongated holes 33a, 33b3, and 33c1 coincide with the centers of the respective through holes of the pressing ring connecting portions 42a, 42b, and 42c. In addition, the center of the retaining ring 3E reduced in diameter by tightening and the center of the pressing ring 4E also coincide with each other. Therefore, the connecting means 5 does not hinder the diameter reduction, and a load is not locally applied to the ring body 30E to cause cracks or the like.

Figure 27:
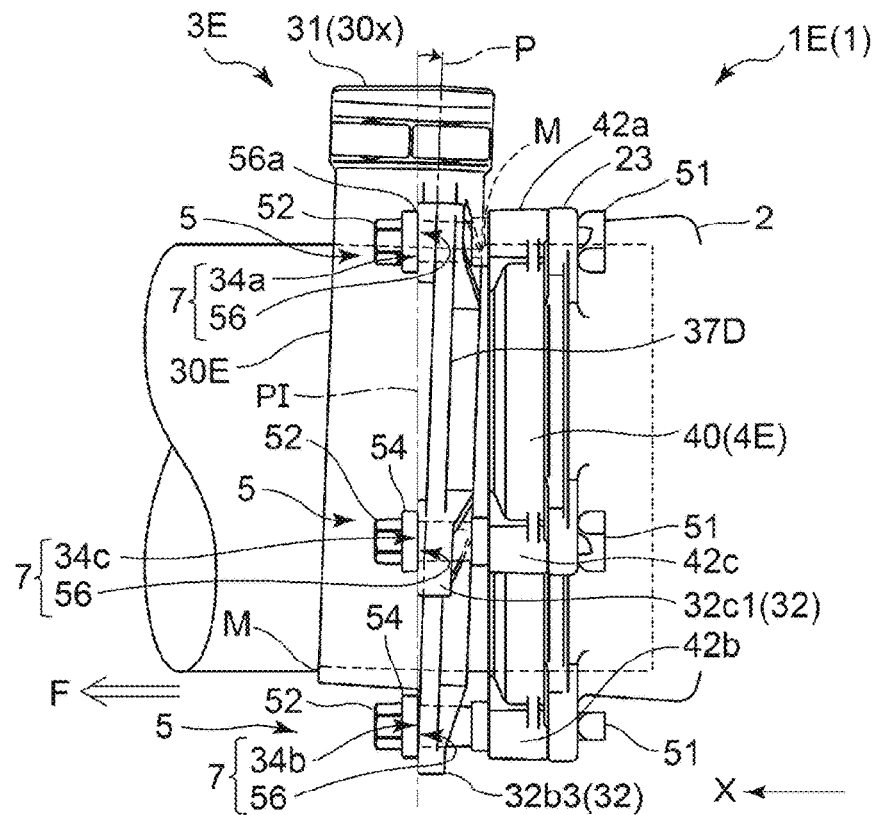
FIG. 27 is a diagram corresponding to FIG. 7 in the fifth embodiment.
Figure 28:
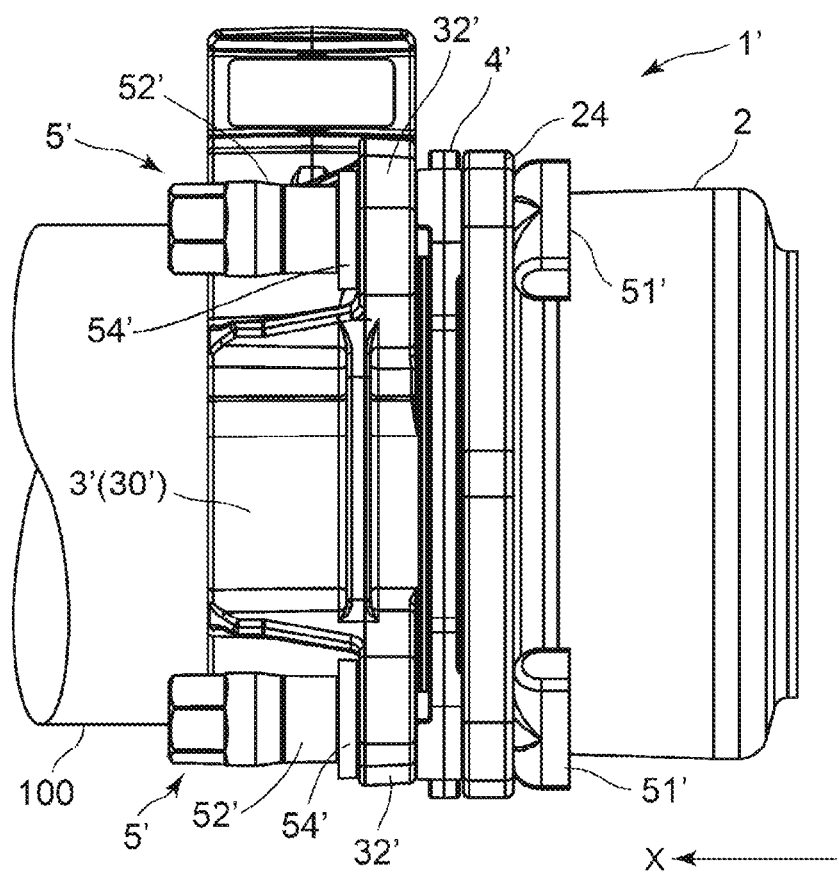
FIG. 28 is a side view showing a conventional pipe retaining device.

Moreover, when the pipe pulling force F is further applied, as shown in FIG. 27, the retaining ring 3D is inclined with the upper ends 56a as a base due to the interval B (space) and the inclined plane PI (second surfaces 34a, 34b, and 34c). Then, the ring body 30E comes into contact with the joint pipe 100 to deform (bend) the joint pipe 100. A formed deformed portion M opposes the pipe pulling force F, and the tooth portions 39 at the circumferential center portion 30y further bite into the joint pipe 100, so that it is possible to greatly improve the detachment preventing force for the pipe.

OTHER EMBODIMENTS

Finally, the possibilities of still other embodiments of the present invention will be described.

In each of the above embodiments, the description has been given with a high-performance polyethylene pipe (SDR11 PE100) as the joint pipe 100. High-performance polyethylene pipes include SDR13.6, SDR17, and SDR21 in addition to SDR11, depending on the relationship between pipe outer diameter and wall thickness, and the present invention can also be applied to these high-performance polyethylene pipes. In addition, the present invention can also be applied to crosslinked polyethylene pipes and polybuden pipes used as hot water pipes, etc.

In the above fourth embodiment, the third retaining ring connecting portions 33c are provided between the first retaining ring connecting portions 32a and the second retaining ring connecting portions 32b2 and these connection portions are provided so as to be line-symmetrical with respect to the center line L. However, the present invention is not limited thereto, and a plurality of pairs of third retaining ring connecting portions 32c may be provided. For example, a joint pipe having a larger bore diameter can be handled by using, for example, 8 or 10 first penetrating members (T-shaped bolts) 51 and 8 or 10 second penetrating members (flanged cap nuts) 52 such that these members are line-symmetrical with respect to the center line L.

In the above second embodiment, a pair of first retaining ring connecting portions 32a, 32a and one second retaining ring connecting portion 32b1 are provided. However, the present invention is not limited thereto, and a plurality of pairs of first retaining ring connecting portions 32c may be provided. For example, a joint pipe having a larger bore diameter can be handled by using, for example, 5 or 7 first penetrating members (T-shaped bolts) 51 and 5 or 7 second penetrating members (flanged cap nuts) 52 such that these members are line-symmetrical with respect to the center line L.

In each of the above embodiments, an inner core is omitted, but the present invention can also be applied to the case of using an inner core. The inner core prevents the diameter of the joint pipe 100 from being reduced, but according to an experiment by the inventor, it was confirmed that when the pipe pulling force is increased, the retaining ring 3 is inclined by the inclination mechanism 7 and the joint pipe 100 and the fitting body 2 are maintained coaxially. That is, the present invention can be used (shared) regardless of whether or not the inner core is used, and the versatility is extremely high.

DESCRIPTION OF THE REFERENCE CHARACTERS 1, 1A to E pipe retaining device
2 fitting body
3 retaining ring
4 pressing ring
5 connecting means
6 packing
7 inclination mechanism
8
9 tightening means
9a bolt
9b cap nut
9c opening nut
21 receiving portion
22 cavity
23 flange
24 through hole
30 ring body
30x circumferential end portion
30y circumferential center portion
31 projecting piece
31a through hole
32 retaining ring connecting portion
32a first retaining ring connecting portion
32b second retaining ring connecting portion
32c third retaining ring connecting portion
33 retaining ring penetration portion
33a first retaining ring penetration portion
33b second retaining ring penetration portion
33c third retaining ring penetration portion
34a, 34b, 34c second surface
37 first rib
38 second rib
39 tooth portion
40 main body
41
42 pressing ring connecting portion
42a first pressing ring connecting portion
42b second pressing ring connecting portion
42c third pressing ring connecting portion
43 pressing ring through hole
51 first penetrating member (T-shaped bolt)
52 second penetrating member (flanged cap nut)
53 connection portion (cylindrical portion)
53a thread groove 53b end portion
54 facing portion (flange portion)
55 contact member (washer)
56 first surface
56a upper end
56b lower end
100 joint pipe
X pipe axis direction
B interval
C central axis
D1, D2, D3 longitudinal direction
d1, d2, d3 center line
L center line
P reference plane
PI inclined plane
Q facing plane
W1 maximum width (length) in pipe axis direction
W2 length of cylindrical portion
θ inclination angle

The invention claimed is:

1. A pipe retaining device for a pipe fitting, comprising: a retaining ring tightened and fixed to an outer peripheral surface of a joint pipe by reducing a diameter of a ring body having a C-shaped ring shape by tightening means; a pressing ring configured to press a packing against a receiving portion of a fitting body; and connecting means configured to connect the retaining ring and the pressing ring to the fitting body, wherein the retaining ring includes a pair of projecting pieces which are provided at both circumferential end portions of the ring body and each of which has a through hole through which the tightening means is caused to extend, a tooth portion which is provided on an inner side of the ring body and which bites into the joint pipe due to diameter reduction by the tightening means, and a plurality of retaining ring connecting portions which are arranged at appropriate intervals along a circumferential direction of the ring body and each of which has a retaining ring penetration portion through which the connecting means is caused to extend, the pressing ring includes a plurality of pressing ring connecting portions which face the plurality of retaining ring connecting portions in a pipe axis direction and each of which has a pressing ring through hole through which the connecting means is caused to extend, the connecting means includes first penetrating members each of which extends through a through hole of the fitting body and the pressing ring through hole, and second penetrating members each of which includes a connection portion extending through the retaining ring penetration portion and connected to the first penetrating member and a facing portion facing the retaining ring connecting portion in the pipe axis direction, the pipe retaining device includes an inclination mechanism configured to incline the retaining ring in the pipe axis direction with respect to a reference plane orthogonal to a central axis of the ring body, such that each circumferential end portion of the ring body is caused to be closer to the fitting body and a circumferential center portion of the ring body is moved away from the fitting body, when each retaining ring connecting portion and each facing portion come into contact with each other in a state where the diameter of the ring body is reduced by the tightening means, a first surface, facing the retaining ring connecting portion, of each facing portion is parallel to the reference plane, second surfaces, facing the facing portions, of the plurality of retaining ring connecting portions are located within the same inclined plane inclined in the pipe axis direction with respect to the reference plane, and an interval between the first surface and the inclined plane becomes larger from the circumferential end portions toward the circumferential center portion.

2. The pipe retaining device for a pipe fitting according to claim 1, wherein the plurality of retaining ring connecting portions include a pair of first retaining ring connecting portions adjacent to the pair of projecting pieces, and a pair of second retaining ring connecting portions adjacent to the pair of first retaining ring connecting portions, the pair of first retaining ring connecting portions and the pair of second retaining ring connecting portions are arranged so as to be line-symmetrical with respect to a center line connecting the central axis and the circumferential center portion, first retaining ring penetration portions of the first retaining ring connecting portions are each an elongated hole in which the connection portion is slidable along the circumferential direction of the ring body and which has a smaller width than the facing portion, and second retaining ring penetration portions of the second retaining ring connecting portions are each an elongated hole in which the connection portion is slidable in a direction along the center line and which has a smaller width than the facing portion.

3. The pipe retaining device for a pipe fitting according to claim 1, wherein the plurality of retaining ring connecting portions include a pair of first retaining ring connecting portions adjacent to the pair of projecting pieces, and a second retaining ring connecting portion located at the circumferential center portion, the pair of first retaining ring connecting portions are arranged so as to be line-symmetrical with respect to a center line connecting the central axis and the circumferential center portion, first retaining ring penetration portions of the first retaining ring connecting portions are each an elongated hole in which the connection portion is slidable along the circumferential direction of the ring body and which has a smaller width than the facing portion, and a second retaining ring penetration portion of the second retaining ring connecting portion is a recess which is open on one side thereof or a hole which has a smaller width than the facing portion and in which the connection portion is slidable in a direction along the center line.

4. The pipe retaining device for a pipe fitting according to claim 3, wherein the plurality of retaining ring connecting portions further include a pair of third retaining ring connecting portions each located at an intermediate portion between the first retaining ring connecting portion and the second retaining ring connecting portion, the pair of third retaining ring connecting portions are arranged so as to be line-symmetrical with respect to the center line connecting the central axis and the circumferential center portion, and third retaining ring penetration portions of the third retaining ring connecting portions are each an elongated hole in which the connection portion is slidable along the circumferential direction of the ring body and which has a smaller width than the facing portion.

5. The pipe retaining device for a pipe fitting according to claim 1, wherein
the plurality of retaining ring connecting portions include a pair of retaining ring connecting portions each located at an intermediate portion between the circumferential center portion and the circumferential end portion of the ring body,
the pair of retaining ring connecting portions are arranged so as to be line-symmetrical with respect to a center line connecting the central axis and the circumferential center portion, and
retaining ring penetration portions of the retaining ring connecting portions are each a recess which is open on one side thereof or an elongated hole which has a smaller width than the facing portion and in which the connection portion is slidable.

6. The pipe retaining device for a pipe fitting according to claim 1, wherein
the plurality of retaining ring connecting portions include a pair of first retaining ring connecting portions adjacent to the pair of projecting pieces, a pair of second retaining ring connecting portions adjacent to the circumferential center portion, and a pair of third retaining ring connecting portions each located at an intermediate portion between the first retaining ring connecting portion and the second retaining ring connecting portion,
the pair of first retaining ring connecting portions, the pair of second retaining ring connecting portions, and the pair of third retaining ring connecting portions are arranged so as to be line-symmetrical with respect to a center line connecting the central axis and the circumferential center portion, and
a retaining ring penetration portion of each of the retaining ring connecting portions is an elongated hole in which the connection portion is slidable along the circumferential direction of the ring body and which has a smaller width than the facing portion.

7. The pipe retaining device for a pipe fitting according to claim 1, wherein the first penetrating members are T-shaped bolts, and the second penetrating members are flanged cap nuts.

8. The pipe retaining device for a pipe fitting according to claim 7, wherein the connecting means further includes contact members through each of which the first penetrating member extends and each of which comes into contact with the connection portion and the pressing ring connecting portion.

9. The pipe retaining device for a pipe fitting according to claim 1, wherein the inclined plane is a plane inclined at an angle greater than 0° and equal to or less than 5° in the pipe axis direction with respect to the reference plane.

* * * * *